United States Patent
Lakings et al.

(10) Patent No.: US 10,544,673 B2
(45) Date of Patent: Jan. 28, 2020

(54) APPARATUS AND METHOD USING MEASUREMENTS TAKEN WHILE DRILLING CEMENT TO OBTAIN ABSOLUTE VALUES OF MECHANICAL ROCK PROPERTIES ALONG A BOREHOLE

(71) Applicant: Fracture ID, Inc., Denver, CO (US)

(72) Inventors: James D. Lakings, Evergreen, CO (US); Jeffrey A. Godwin, Lone Tree, CO (US); Jesse B. Havens, Denver, CO (US); Joshua D. Ulla, Denver, CO (US)

(73) Assignee: Fracture ID, Inc., Denver, CO (US)

( * ) Notice: Subject to any disclaimer, the term of this patent is extended or adjusted under 35 U.S.C. 154(b) by 127 days.

(21) Appl. No.: 15/616,742

(22) Filed: Jun. 7, 2017

(65) Prior Publication Data

US 2017/0275989 A1  Sep. 28, 2017

Related U.S. Application Data

(63) Continuation-in-part of application No. 14/850,710, filed on Sep. 10, 2015, now Pat. No. 10,132,162.

(Continued)

(51) Int. Cl.
*G06F 19/00* (2018.01)
*E21B 49/00* (2006.01)
(Continued)

(52) U.S. Cl.
CPC ............ *E21B 49/003* (2013.01); *E21B 43/26* (2013.01); *E21B 47/026* (2013.01); *E21B 47/16* (2013.01);
(Continued)

(58) Field of Classification Search
CPC ...... E21B 49/003; E21B 49/008; G01V 1/306
(Continued)

(56) References Cited

U.S. PATENT DOCUMENTS 2,452,515 A  10/1948  Athy
4,641,724 A   2/1987  Chow et al.
(Continued)

FOREIGN PATENT DOCUMENTS

CN  101071178  11/2007
CN  101575970  11/2009
(Continued)

OTHER PUBLICATIONS

Tokhmchi, B. et al., Estimation of the fracture density in fractured zones using petrophysical logs, Journal of Petroleum Science and Engineering, 72:206-213 (2010).
(Continued)

*Primary Examiner* — Edward Raymond
(74) *Attorney, Agent, or Firm* — Polsinelli PC

(57) ABSTRACT

An innovative apparatus and computer implemented methods to obtain values for a set of scalars corresponding to each force and displacement, which may be obtained from acoustical signals captured by sensors of a drill bit while drilling, in a material of known mechanical properties, such as a cement from casing the well, such that the application and use of the scalars in relation to measurements of the mechanics while drilling, such as the acceleration of the bit and motion of the bit captured by sensors such as accelerometers, allow for absolute values of mechanical rock properties to be obtained in rock formations, being drilled through, with otherwise unknown mechanical properties prior to drilling.

29 Claims, 22 Drawing Sheets

Related U.S. Application Data

(60) Provisional application No. 62/346,894, filed on Jun. 7, 2016, provisional application No. 62/048,669, filed on Sep. 10, 2014.

(51) Int. Cl.
| | | |
|---|---|---|
| *G01V 1/44* | (2006.01) | |
| *G01V 1/30* | (2006.01) | |
| *E21B 43/26* | (2006.01) | |
| *E21B 47/026* | (2006.01) | |
| *E21B 47/16* | (2006.01) | |
| *G01V 1/28* | (2006.01) | |

(52) U.S. Cl.
CPC ............ *E21B 49/006* (2013.01); *G01V 1/306* (2013.01); *G01V 1/44* (2013.01); *G01V 1/288* (2013.01); *G01V 2200/16* (2013.01); *G01V 2210/62* (2013.01); *G01V 2210/646* (2013.01)

(58) Field of Classification Search
USPC ............................... 702/6–14, 182–185, 188
See application file for complete search history.

(56) References Cited

U.S. PATENT DOCUMENTS

| | | | |
|---|---|---|---|
| 4,718,048 | A | 1/1988 | Staron et al. |
| 4,870,627 | A | 9/1989 | Hsu |
| 5,130,951 | A | 7/1992 | Kingman |
| 5,148,407 | A | 9/1992 | Haldorsen et al. |
| 5,372,207 | A | 12/1994 | Neville et al. |
| 6,196,335 | B1 | 3/2001 | Rodney |
| 6,349,595 | B1 | 2/2002 | Civolani |
| 6,924,646 | B2 | 8/2005 | Omeragic |
| 7,289,909 | B2 | 10/2007 | Thomann et al. |
| 7,310,580 | B2 | 12/2007 | Zhou et al. |
| 7,404,456 | B2 | 7/2008 | Weaver et al. |
| 7,650,241 | B2 | 1/2010 | Jogi et al. |
| 8,215,384 | B2 | 7/2012 | Trinh et al. |
| 8,478,530 | B2 | 7/2013 | Rabinovich et al. |
| 8,553,493 | B2 | 10/2013 | Wu et al. |
| 9,664,039 | B2 | 5/2017 | Neale et al. |
| 10,132,162 | B2 | 11/2018 | Neale |
| 2003/0014190 | A1 | 1/2003 | Dubinsky et al. |
| 2003/0218939 | A1 | 11/2003 | Casarsa et al. |
| 2007/0079962 | A1* | 4/2007 | Zazovsky ............. E21B 49/008 166/264 |
| 2010/0038135 | A1 | 2/2010 | Hummes et al. |
| 2010/0175873 | A1* | 7/2010 | Milkovisch ........... E21B 49/008 166/264 |
| 2010/0191471 | A1 | 7/2010 | De Reynal |
| 2011/0246159 | A1 | 10/2011 | Herwanger |
| 2012/0103688 | A1 | 5/2012 | Coman et al. |
| 2012/0173216 | A1 | 7/2012 | Koepsell |
| 2012/0222901 | A1 | 9/2012 | Pei |
| 2013/0075159 | A1 | 3/2013 | Yang |
| 2013/0116926 | A1 | 5/2013 | Rodney et al. |
| 2013/0211726 | A1 | 8/2013 | Mestayer et al. |
| 2014/0069653 | A1 | 3/2014 | Liu |
| 2015/0300161 | A1 | 10/2015 | Kamata |
| 2016/0069182 | A1 | 3/2016 | Neale et al. |

FOREIGN PATENT DOCUMENTS

| | | |
|---|---|---|
| WO | WO 2013036357 | 3/2013 |
| WO | 2016040669 | 3/2016 |
| WO | WO 2017214316 | 12/2017 |

OTHER PUBLICATIONS

International Searching Authority, International Search Report and Written Opinion, issued in connection with PCT/US2015/049474, dated Jan. 11, 2016, pp. 1-13.

United States Patent and Trademark Office, Non-Final Office Action, issued in connection with U.S. Appl. No. 15/182,012, dated Dec. 9, 2016 (9 pages).

Response to Non-Final Office Action, issued in connection with U.S. Appl. No. 15/182,012, submitted Mar. 7, 2017 (9 pages).

United States Patent and Trademark Office, Notice of Allowance, issued in connection with U.S. Appl. No. 15/182,012, dated Apr. 10, 2017 (7 pages).

International Searching Authority, International Search Report and Written Opinion, issued for PCT/US2017/036419, dated Oct. 6, 2017 (12 pages).

International Preliminary Report on Patentability, issued for PCT/US2017/036419, dated Dec. 11, 2018 (9 pages).

* cited by examiner

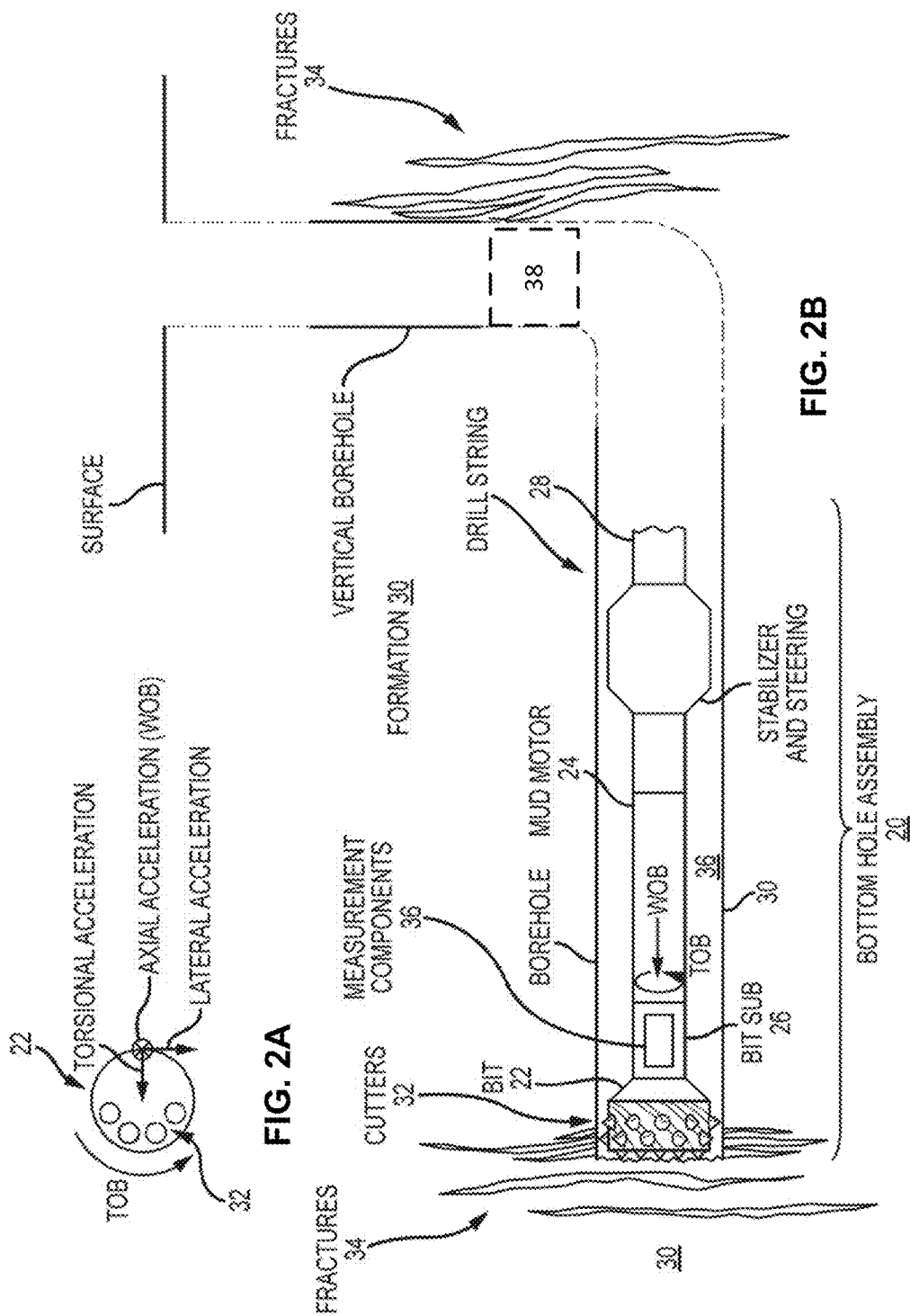

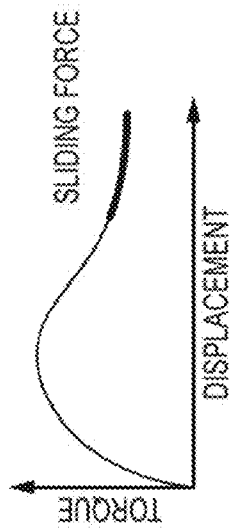
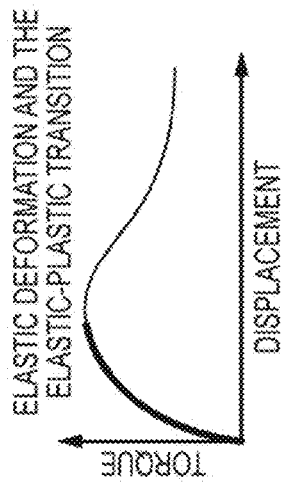
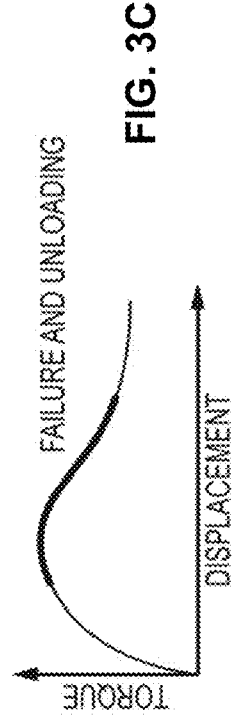
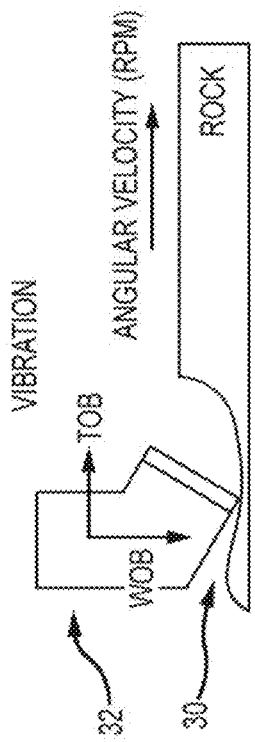
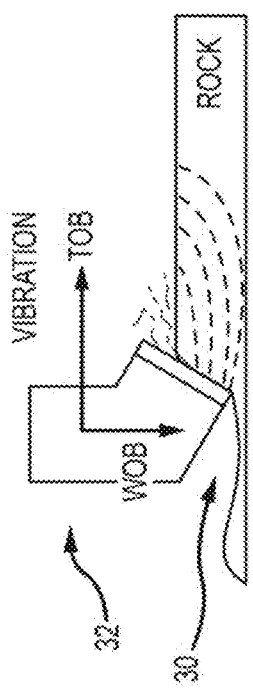
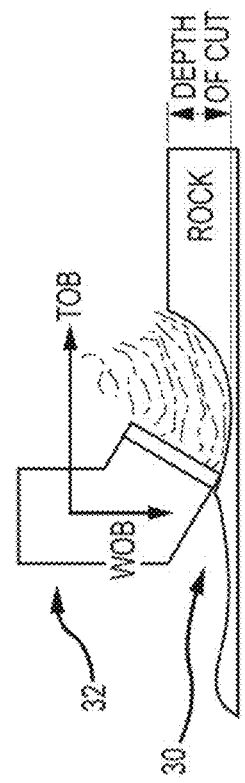
FIG. 3A
FIG. 3B
FIG. 3C $$RMS = \left\{ \frac{1}{T} \int_0^T (\text{Axial Acceleration}(t))^2 \, dt \right\}^{1/2}$$

$$RMS = \left\{ \frac{1}{N} \sum_{F_1}^{F_2} (\text{Axial Acceleration}(f))^2 \right\}^{1/2}$$

FIG. 4

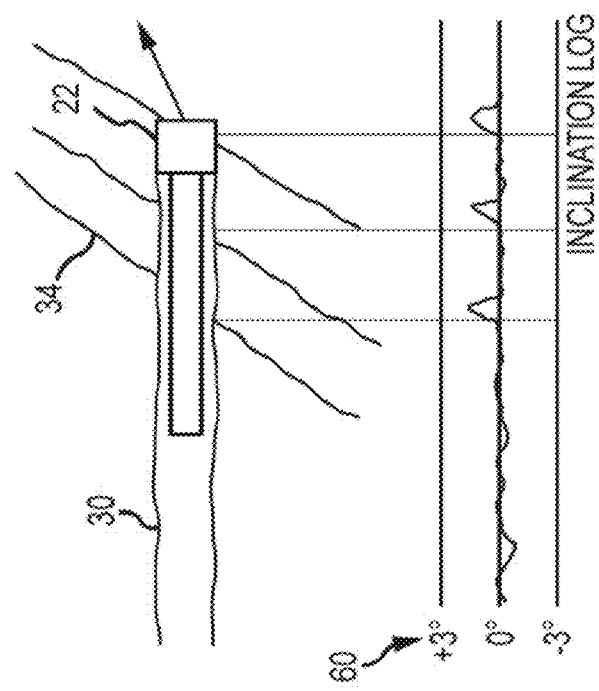
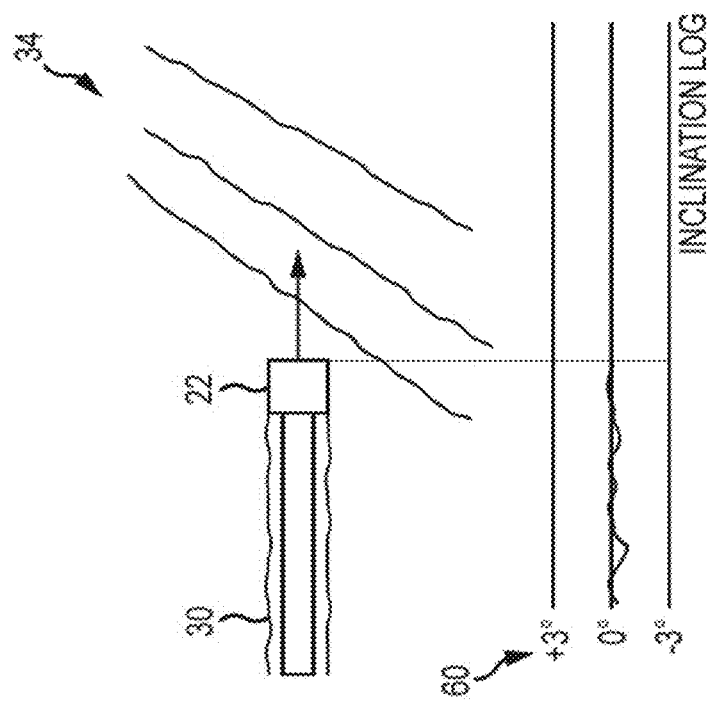
FIG. 6

Axis of TI material symmetry parallel well axis:
TVI for a vertical well; HTI for a horizontal well $$\frac{\varepsilon_1}{\varepsilon_3} = \frac{\sigma_1}{\varepsilon_3}\left[\frac{1}{C_{11}+C_{12}}\right] + \upsilon_{31}$$

$$\frac{\sigma_3}{\sigma_1} = E_3 \frac{\varepsilon_3}{\sigma_1} + 2\upsilon_{31}$$

$\sigma_1$ = TOB $\sigma_3$ = WOB $\varepsilon_3$ = ZFL $_{\text{Axial Displacement}}$

Axis of TI material symmetry perpendicular well axis:
HTI for a vertical well; VTI for a horizontal well $$\frac{\varepsilon_1}{\varepsilon_3} = \frac{\sigma_1}{\varepsilon_3}\left[\frac{1}{C_{11}+C_{12}}\right] + \upsilon_{31}$$

$$\frac{\sigma_3}{\sigma_1} = E_3\frac{\varepsilon_3}{\sigma_1} + 2\upsilon_{31}$$

$\sigma_3$ = TOB $\sigma_1$ = WOB $\varepsilon_3$ = ZFL$_{\text{Rotary Displacement}}$ FIG. 10C (see also 8A)

STRESS-STRAIN RELATIONSHIPS WITH RESPECT TO ORIENTATION FOF DRILLING WELL

AXIS OF MATERIAL SYMMETRY ABOUT WELL AXIS:
HTI FOR A VERTICAL WELL; VTI FOR A HORIZONTAL WELL $$\frac{\varepsilon_1}{\varepsilon_3} = \frac{\sigma_1}{\sigma_3}\left[\frac{1}{c_{11}+c_{12}}\right] + \nu_{31}$$

$$\frac{\sigma_3}{\sigma_1} = E_3 \frac{\varepsilon_3}{\sigma_1} + 2\nu_{31}$$

$\sigma_3 = TOB$
$\sigma_1 = WOB$
$\varepsilon_3 = ZFL\ AXIAL\ DISPLACEMENT$

AXIS OF MATERIAL SYMMETRY ABOUT WELL AXIS:
TVI FOR A VERTICAL WELL; HTI FOR A HORIZONTAL WELL $$\frac{\varepsilon_1}{\varepsilon_3} = \frac{\sigma_1}{\sigma_3}\left[\frac{1}{c_{11}+c_{12}}\right] + \nu_{31}$$

$$\frac{\sigma_3}{\sigma_1} = E_3 \frac{\varepsilon_3}{\sigma_1} + 2\nu_{31}$$

$\sigma_1 = TOB$
$\sigma_3 = WOB$
$\varepsilon_3 = ZFL\ AXIAL\ DISPLACEMENT$

FIG. 11

APPARATUS AND METHOD USING MEASUREMENTS TAKEN WHILE DRILLING CEMENT TO OBTAIN ABSOLUTE VALUES OF MECHANICAL ROCK PROPERTIES ALONG A BOREHOLE

CROSS REFERENCE TO RELATED APPLICATIONS

This application is a non-provisional application claiming priority under 35 U.S.C. § 119 to pending U.S. Provisional Application No. 62/346,894 titled "APPARATUS AND METHOD OF USING MEASUREMENTS TAKEN WHILE DRILLING CEMENT TO OBTAIN ABSOLUTE VALUES OF MECHANICAL ROCK PROPERTIES ALONG A BOREHOLE," filed Jun. 7, 2016, the entire contents of which is fully incorporated by reference herein for all purposes.

This application is also related to and is a continuation-in-part of co-pending U.S. patent application Ser. No. 14/850,710 entitled "APPARATUS AND METHOD USING MEASUREMENTS TAKEN WHILE DRILLING TO MAP MECHANICAL BOUNDARIES AND MECHANICAL ROCK PROPERTIES ALONG A BOREHOLE," filed Sep. 10, 2015, which claims priority under 35 U.S.C. § 119 from U.S. Provisional Application No. 62/048,669 entitled "APPARATUS AND METHOD USING MEASUREMENTS TAKEN WHILE DRILLING TO MAP MECHANICAL BOUNDARIES AND MECHANICAL ROCK PROPERTIES ALONG A BOREHOLE," filed on Sep. 10, 2014, both of which are hereby incorporated by reference in their entirety.

TECHNICAL FIELD

The present disclosure involves measurement while drilling (MWD) techniques that provide mechanical rock properties, and from which fractures and other mechanical boundaries may be identified and used to improve drilling and completion practices, among other things.

BACKGROUND AND INTRODUCTION

A method to obtain absolute values of mechanical rock properties from MWD data using the forces on the bit and the motions of the bit while interacting with a rock formation with known values of mechanical rock properties involves (i) informing the terms and loading conditions of a stress-strain relationship with respect to the material symmetry of the rock formation in relation to the orientation of the drilling well, involves (ii) obtaining values for a set of scalars with respect to the motion of the bit and the acceleration or forces on the bit in relation to the known absolute values of the mechanical rock properties, and (iii) in one particular example obtaining values for the set of scalars when the rock formation is cement.

When specified in absolute values, elastic coefficients can be used, in general, to describe the deformation of a rock formation in response to the forces acting on the rock formation, and in particular, to predict the deformation of a hydrocarbon bearing formation in response to the forces acting on the formation when the forces are fluid pressures generated during the emplacement of hydraulic fractures in connection with a hydraulic fracture stimulation treatment along a horizontal well. Reservoir models that are used to describe the deformation of a reservoir as a result of hydraulic fracture emplacement require absolute values of the mechanical rock properties of the hydrocarbon bearing rock formation. Absolute values of mechanical rock properties are important in order to provide meaningful results to plan a wellbore stimulation treatment.

SUMMARY

Aspects of the present disclosure involve a method of characterizing rock properties while drilling comprising: receiving acoustical signals obtained from one or more sensors positioned on a component of a bottom hole assembly. The sensors (e.g., accelerometers or strain gauges) may be in operable communication with at least one data memory to store the acoustical signals, may perform some real-time processing. The data memory may be on or in the bottom hole assembly, or the acoustical data may be transmitted to a memory structure on the surface, in two possible examples. The acoustical signals, which may also be considered vibrations, are generated from a drill bit interacting with a material, such as cement, having a known mechanical rock property first and then separately with a rock formation, having to be determined rock properties while drilling a wellbore. The method involves obtaining scalars by processing the acoustical signals and applying force or acceleration data, and displacement to a stress strain relationship for the material with known rock properties, and then the method further involves processing the acoustical signals, from the drill bit interacting with the rock formation, to obtain at least one set of data values representative of a mechanical rock property of the rock formation along the wellbore created by the drill bit interacting with the rock formation for a period of time. Processing may be in real-time or from stored data. The scalars are used to obtain absolute values or otherwise normalized values of the mechanical rock properties.

More specifically, the present disclosure describes an innovative technique to obtain values for a set of scalars corresponding to each force and displacement in a material of known mechanical properties such that the application and use of the scalars in relation to measurements of the mechanics while drilling a well such as the acceleration of the bit and motion of the bit allow for absolute values to be obtained in rock formations with unknown mechanical properties.

In one possible example, the disclosure describes a method of characterizing rock properties while drilling comprising receiving acoustical signals obtained from one or more sensors positioned on a component of a bottom hole assembly, the acoustical signals generated from a drill bit interacting with a rock formation while drilling a wellbore. The method further involves processing the acoustical signals to obtain forces acting on the drill bit interacting with the rock formation while drilling the wellbore and to obtain displacements of the drill bit interacting with the rock formation while drilling the wellbore, and scaling the forces and the displacements to obtain information representative of stresses and strains of the drill bit interacting with the rock formation. The method then involves processing the scaled forces and the displacements to obtain at least one set of data values representative of an absolute value of a mechanical rock property of the rock formation along the wellbore created by the drill bit interacting with the rock formation for a period of time.

In one example, the operation of scaling involves applying scalars to the processed forces and displacements, the scalars derived from acoustical signals generated from the drill bit acting on a sample, such as cement, with known mechanical rock properties. The scalars may be obtained by receiving acoustical signals obtained from one or more sensors positioned on a component of a bottom hole assembly, the acoustical signals generated from a drill bit interacting with the sample. The scalars may further be obtained by processing the acoustical signals to obtain forces acting on the drill bit interacting with the sample to obtain displacements of the drill bit interacting with the sample and processing the forces and the displacements to obtain at least one set of scalars that conform to a stress strain relationship of the sample with known mechanical rock properties.

In one example, the stress strain relationship is:

$$\begin{bmatrix} -a_1 & 0 & 0 & d_1C_{11} & d_2C_{12} & d_3C_{12} \\ 0 & -a_2 & 0 & d_1C_{12} & d_2C_{11} & d_3C_{12} \\ 0 & 0 & -a_3 & d_1C_{12} & d_2C_{12} & d_3C_{11} \end{bmatrix} \begin{bmatrix} A \\ B \\ C \\ D \\ E \\ F \end{bmatrix} = \begin{bmatrix} 0 \\ 0 \\ 0 \end{bmatrix}$$

where:

the a values are forces or accelerations acting on the drill bit interacting with the sample;

the d values are displacements the drill bit interacting with the sample;

where $C_{11}$ and $C_{12}$ are populated with known rock properties of the sample; and A-F are the at least one set of scalars being obtained.

In another example, the stress strain relationship is:

$$\begin{bmatrix} -a_1 & 0 & 0 & d_1C_{11} & d_2C_{12} & d_3C_{13} \\ 0 & -a_2 & 0 & d_1C_{12} & d_2C_{11} & d_3C_{13} \\ 0 & 0 & -a_3 & d_1C_{13} & d_2C_{13} & d_3C_{33} \end{bmatrix} \begin{bmatrix} A \\ B \\ C \\ D \\ E \\ F \end{bmatrix} = \begin{bmatrix} 0 \\ 0 \\ 0 \end{bmatrix}$$

where:

the a values are forces or accelerations acting on the drill bit interacting with the sample with respect to an axis of material symmetry of the sample;

the d values are displacements the drill bit interacting with the sample with respect to the axis of material symmetry of the sample;

where the Cijs are populated with known rock properties of the sample; and

A-F are the at least one set of scalars being obtained.

In another aspect of the present disclosure, a method of calibrating mechanical rock property derivations from a drilling tool involves obtaining a force data and a displacement data from signals obtained from one or more sensors positioned on a component of a drilling tool proximate a drill bit, the force data and the displacement data being of a drill bit interacting with a material with known mechanical rock properties, and processing the force data and the displacement data to obtain a set of scalars that conform to a stress strain relationship of the material with a known mechanical rock property. In this example, the stress strain relationship may be:

$$\begin{bmatrix} -a_1 & 0 & 0 & d_1C_{11} & d_2C_{12} & d_3C_{12} \\ 0 & -a_2 & 0 & d_1C_{12} & d_2C_{11} & d_3C_{12} \\ 0 & 0 & -a_3 & d_1C_{12} & d_2C_{12} & d_3C_{11} \end{bmatrix} \begin{bmatrix} A \\ B \\ C \\ D \\ E \\ F \end{bmatrix} = \begin{bmatrix} 0 \\ 0 \\ 0 \end{bmatrix}$$

where:

the a values are the force data with respect to an axis of material symmetry of the material;

the d values are the displacement data with respect to the axis of material symmetry of the material;

where $C_{11}$ and $C_{12}$ are populated with the known rock property of the material; and A-F are the set of scalars.

In an alternative, the stress strain relationship may be:

$$\begin{bmatrix} -a_1 & 0 & 0 & d_1C_{11} & d_2C_{12} & d_3C_{13} \\ 0 & -a_2 & 0 & d_1C_{12} & d_2C_{11} & d_3C_{13} \\ 0 & 0 & -a_3 & d_1C_{13} & d_2C_{13} & d_3C_{33} \end{bmatrix} \begin{bmatrix} A \\ B \\ C \\ D \\ E \\ F \end{bmatrix} = \begin{bmatrix} 0 \\ 0 \\ 0 \end{bmatrix}$$

where:

the a values are the force data with respect to an axis of material symmetry of the material;

the d values are the displacement data with respect to the axis of material symmetry of the material;

where the Cijs are populated with the known mechanical rock property of the material; and A-F are the set of scalars.

These and other aspects of the present disclosure are set out below.

BRIEF DESCRIPTION OF THE FIGURES

FIG. 2A-2B is a diagram of a drill bit assembly including sensors for measuring bit accelerations and forces on the bit, and which includes at least one processing unit and tangible storage media in which to store acceleration and/or force data, and which may also store processed acceleration and/or force data of the drill bits interaction with a formation while drilling.

FIGS. 3A-3C illustrate the cutting action of a drill bit, stick slip fracturing of a rock formation, torque on bit and weigh on bit forces, and related torque and displacement curves.

FIG. 4 illustrates root mean square computations for axial acceleration of the bit as used in computing rock properties.

FIG. 6 is a diagram illustrating drill bit behaviour when encountering a mechanical discontinuity or geological boundary, the cutting face of the drill bit may change its orientation, as detectable from acceleration data, in response to the orientation and stresses acting on the heterogeneity.

FIGS. 10A-10C a constitutive stress strain relationships for an axis of material parallel and perpendicular a well axis, using acceleration data.

FIG. 11 illustrates constitutive stress strain relationships for an axis of material symmetry parallel a well axis and axis of symmetry perpendicular a well axis, with Poisson's ration and Young's Modulus of Elasticity computed from measurement while drilling data of torque on bit, weigh on bit, and acceleration data to obtain lateral and axial displacement.

DETAILED DESCRIPTION

Figure 1B:
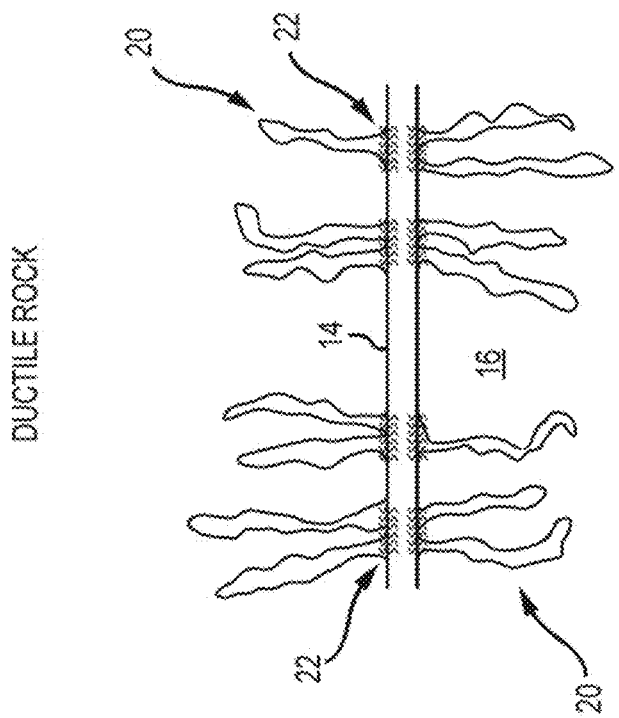
FIGS. 1A-1B Illustrate reservoir-to-well connectivity where brittle rocks are generally associated with larger fracture creation and better proppant support that is more permeable than ductile rock that produces smaller, less productive fractures which are prone to rapid compaction and closure and are less permeable.

The present disclosure involves an inventive way of using drilling vibrations generated by the deformation of a rock formation in response to forces acting on the rock formation, where the forces are related to a drill bit and drilling fluid system, to obtain mechanical rock properties of a formation, identify the nature and occurrence of fractures, fracture swarms and other mechanical discontinuities (boundaries) such as bedding planes and/or faults that offset or otherwise separate rock formations with different mechanical rock properties.

As will be appreciated from the devices, systems and methods provided and disclosed herein, aspects of the present disclosure may also involve the determination of absolute values of mechanical rock properties, which becomes possible from the application and use of (i) the forces or accelerations of the drill bit and (ii) the displacements or motions of the drill bit such as those obtained from recording the near-bit mechanical drilling vibrations in relation to the drill bit interacting with the rock formation. In one specific example, drilling vibrations experienced by the drill bit from its breaking of rock while drilling, propagate as acoustical signals that are translated into data by accelerometers or other sensors positioned proximate the drill bit. The acoustical signals are translated into mechanical rock properties according to the techniques discussed herein. Further, by first drilling through some known media, such as cement in the well, the system may capture data and generate scalars that can be used to transform derived mechanical rock properties, from data capture in the same manner, for an unknown media, such as a formation being drilled through, into absolute values of mechanical rock properties for that formation.

The techniques and measurements from this disclosure may be made, in whole or in part, using downhole tools that are simple and rugged, allowing for a magnitude in order reduction in logging cost to characterize near-wellbore rock mechanical properties, which may further include identifying and characterizing intersected existing fracture locations. The low cost to log a well, which may typically be less than 0.5% of the total well cost, allows for widespread use of the technique. Detailed knowledge of rock property variability along a wellbore allows for grouping like-for-like rock types in variable length stages, avoiding losing reserves due to a lack of fracture initiation relative to mixed rock strength stages. Scaling mechanical rock property computations to further obtain absolute values of such mechanical rock property computations may further enhance the methods and systems.

Further elaboration of the method describes how mechanical rock properties, and in particular elastic coefficients of a rock formation, can be determined through the application and use of innovative, new stress-strain relationships that systematically relate measurements of the forces acting on rock formation in connection with the drill bit and drilling fluid system (stress) to the variations in the drilling vibrations generated by the deformation of the rock formation in response to the cutting action of the bit (strain).

The elastic coefficients can be used, in general to describe the deformation of a rock formation in response to the forces acting on the rock formation, and in particular, to predict the deformation of a hydrocarbon bearing formation in response to the forces acting on the formation where the forces are fluid pressures generated during the emplacement of hydraulic fractures in connection with a hydraulic fracture stimulation treatment along a horizontal well.

The processing of drilling vibrations when recorded using sensors deployed in a borehole in connection with a bottom hole assembly (BHA) according to the method disclosed here, can provide measurements of mechanical rock properties including the nature and occurrence of mechanical discontinuities, such as pre-existing fractures, which can be used to target sections of the well where the rock properties are conducive to economical hydraulic stimulation and to avoid sections that are viewed as sub-commercial, where the rock properties are not conducive to economical hydraulic stimulation.

In another embodiment of the method, the elastic coefficients and variations in the elastic coefficients that are obtained while conducting drilling operations can be used for assisting, in real-time, the steering of the bottom hole assembly in order to maintain the tracking of the drill bit through geological formations as are targeted according to the desired mechanical rock properties, especially where the mechanical rock properties are relevant to the production of commercially significant hydrocarbons using hydraulic fracturing stimulation techniques.

The present disclosure generally relates to the production of commercially significant hydrocarbons from oilfield drilling operations and completion operations. Recent unconventional resource development has identified a need for economical determination of rock properties and natural fracture swarm locations along a horizontal well in order to optimize the location and intensity of hydraulic stimulation treatments.

The techniques described in this disclosure will provide new information for selecting hydrocarbon bearing zones by differentiating between brittle rocks generally associated with larger fracture creation and better proppant support that is more permeable than ductile rock that produces smaller, less productive fractures which are prone to rapid compaction and closure and are less permeable. Natural fracture identification also refines the process of hydraulic stimulation optimization by providing direct measurement of zones that offer higher permeability and higher hydrocarbon productivity.

Physical Basis of the Method

Aspects of the present disclosure involve methodologies that use broad band measurements (e.g., continuous, high resolution) of drilling vibrations and drilling dynamics data taken proximate the drill while conducting drilling operations bit to log the mechanical properties of a rock formation.

Drilling vibrations generated by the deformation and failure of a rock formation are generally related to the mechanical properties of the rock being drilled. It is generally understood that the depth of cut or the tooth penetration into the rock is inversely related to the strength of the rock. Higher amplitude drilling vibrations occur in rocks that undergo a greater depth of cut and deeper tooth penetration in response to the forces acting on the formation in connection with the drill bit and drilling fluid system, whereas lower amplitude drilling vibrations occur in rocks that undergo relatively lower depth of cut and lesser tooth penetration. Increased depth of cut indicate the bit is moving into an area of lesser relative mechanical rock strength, and decreased relative drilling vibrations indicate the bit is moving into an area of greater relative rock strength all other things being equal.

Generally speaking, rock formations that take a relatively long time to drill through or where the rate of penetration is slow are generally referred to strong or hard formations and have a lesser depth of cut in relation to rock formations that are relatively weaker and less rigid. These basic principles have enabled the application and use of techniques that take measurements of the hardness of a rock formation by forcing a tool into a rock to make an indentation where the depth of the indentation relative to the force applied is used to obtain a hardness characteristic that is essentially a mechanical property of a rock formation.

The presence of mechanical discontinuities, such as pre-existing fractures, and geological boundaries, such as faults, in a rock formation generally act to weaken the rock formation. Fractured rock formations, are generally weaker and less rigid than intact, unfractured or stiff or otherwise competent rock formations. As the drill bit encounters fractures in a rock formation the tooth penetration or depth of cut and subsequently the drilling vibrations will increase, because the rock formation is less rigid because it has been weakened by the presence of fractures. Stated differently, as the drill moves into and through existing fractures, the measured mechanical rock strength will decrease relative to the same rock formation without a fracture or with lesser fractures, for example.

General Description of Fracture Identification in Relation to the Method

Signal processing techniques are used to process the drilling data to identify locations where the changes in the drilling vibration indicate that the drill bit has encountered a mechanical discontinuity or geological boundary. If the changes in the drilling vibration as expressed through the results of the geophysical signal processing techniques are rapid and discrete in both space and time, and then return back to a long-term trend or the levels that were recorded prior to the change in the drilling vibrations, then it would indicate that that the drill bit has encountered and crossed a discrete mechanical discontinuity because mechanical rock properties that are discrete in both space and time are uniquely separated from the mechanical properties of a rock formation such as would be in the case of a drill bit penetrating a fracture face. If the changes in drilling vibration are rapid and discrete and continue over a short interval, then that would indicate multiple fractures or a swarm of fractures has been encountered.

If the signal processing techniques indicate that the changes in the drilling vibration are rapid, but then do not revert back to the level prior to the change and instead carry on at a new, significantly different level, then that indicates a mechanical boundary where the mechanical boundary that separates or offsets two different rock formations such as a bedding plane and or fault has been encountered and crossed. Whether or not the boundary is related to a fault or a bedding plane depends on the inclination of the bit with respect to the orientation of the stratigraphy of the rock formation being drilled. Other information may also be used to determine whether or not the mechanical boundary was a bedding-plane fault or bedding plane that acted as a zone of weakness that had experienced measurable displacement in the past.

The description provides a method to evidence the presence of fractures, fracture swarms and other mechanical discontinuities such as faults and bedding planes that offset or otherwise separate rock formations with different rock properties. The approach uses geophysical signal processing techniques that are sensitive to changes in the drilling vibrations where the changes are relative to some baseline, such as a normalized preceding set of drilling vibration data, and whether or not the changes are discrete and then return back to the level prior to the change or are maintained at a new level that is different than the level observed prior to the change.

The following method disclosed below further elaborates on the outlined principles to provide a general, independent method to specify the mechanical properties of a rock formation by processing the drilling vibrations in relation to the forces acting on the formation in connection with a drill bit and, in some instances, a drilling fluid system, which includes the mud motor and the drilling fluid, including mud, that turns the motor. This method specifies the mechanical properties of a rock formation through the application and use of innovative, new stress-strain relationships, among other advances.

Because the cutting depth or the penetration of the bit tooth into the formation is a measurement of displacement, the drilling vibrations describe the strain experienced by a rock formation in response to the cutting action of the bit where greater cutting depths and a greater penetration of the bit tooth relative to the same volume of rock result in a higher strain. Strain is understood to describe a change in volume of a rock under some force. In some aspects, strain is reflected by axial displacement of the bit per turn of the bit. In one example, axial displacement is computed as a double integral of the accelerometer data (axial) for one revolution of the bit to yield a distance measurement for one revolution (or some other known number of turns). If this strain is calculated with respect to time, then the drilling vibrations can be used to describe the strain rate. The converse with regards to the strain and the rate of strain is also held to be evident.

Through the techniques described herein, the drilling vibration characteristics, which may be supplemented with drilling dynamics data including forces on the bit, such as torque on bit and weight on bit, are translated into mechanical properties of a rock formation. The depth of cut, as obtained based on vibration assessment, may be normalized against direct weight on bit and/or torque on bit measurements, or weight on bit or torque on bit measurements extrapolated from vibration information.

General Stress-strain Relationships

Stress-strain relationships are established by systematically relating forces acting on the formation in connection with the drill bit and drilling fluid system to the geophysical signal processing of drilling vibrations generated by the deformation of the rock in response to the cutting action of the bit. This approach allows elastic coefficients (K) to be derived in accordance with the following equation where (e) is the general deformation (strain) of a rock formation in response to the forces acting on a rock formation (S) (stress).

$$S = K\,e$$

In accordance with some methods set out herein, strain (the motion or displacement of the bit is obtained by signal processing the drilling vibrations as are transmitted along the drilling assembly by sensors deployed in a borehole in connection with a BHA. Stress, in accordance with some methods set out herein, is obtained from either (i) downhole or (ii) surface measurements of torque and/or weight on bit, or (iii) in another example, the accelerations of the bit are related to forces on bit where it understood that the acceleration is a representation of force per unit mass. It should be appreciated that forces can be converted to stresses with knowledge of the effective contact area of the bit and formation, and the effective rock volume the bit is acting on. Conversely, forces can be substituted for stresses with the understanding that a geometric correction in relation to the effective contact area is required to obtain absolute values for the mechanical rock properties. One example of such a contact area is the area of the bit.

The equations of linear elasticity are useful for describing the relationship between the changes in shape and position of a material in relation to the forces acting on the material. Such stress-strain relationships are known in general as Hooke's law where the coupling of the stress-strain relationship behavior is described through a matrix of coefficients whose values depend on the conditions used to load the material in relation to the structural symmetry of the material being loaded. These coefficients are colloquially known as the cij's and can be arranged in well-known and convenient forms to represent Young's Modulus of Elasticity (YME) and Poisson's Ratio (PR). In one example of the technique presented here, the YME and PR values are systematically determined by the loading conditions of the bit in relation to the axis of material symmetry used to describe the rock formation.

In one specific implementation, the constitutive equations of linear elasticity are uniquely expressed through the application and use of MWD data to (i) populate the variables of the constitutive equations of linear elasticity and (ii) undertake an analysis of the constitutive equations to obtain measurements of near-wellbore mechanical rock properties of (a) Young's modulus of elasticity and (b) Poisson's ratio. Further, variations in the mechanical rock properties (e.g., YME and PR) are used to identify the nature and occurrence of mechanical boundaries or discontinuities in the subsurface such as fractures.

More specifically, a technique to determine near-wellbore mechanical rock properties, YME and PR, from MWD data may involve processing measurements of the weight on bit (WOB), torque on bit (TOB), Annular fluid pressure (Ap), angular bit speed (RPM) and components of motion describing the acceleration of the bit, including axial, and the rotary or tangential accelerations to (i) obtain sets of MWD data corresponding to known temporal and spatial positions along the borehole, (ii) calculate the forces acting on the rock formation in connection with the drilling apparatus and drilling fluids, (iii) calculate the displacements of the bit as it is accommodated by the deformation of the rock formation, (iv) inform the terms and loading conditions (variables) of a linear, elastic stress-strain relationship that describes the constitutive behavior of the rock formation in relation to the orientation of the well and (v) using the constitutive linear elastic equations as determined through the application and use of the MWD data to calculate the aforementioned mechanical rock properties, (YME and PR) and (vi) analyzing the YME and PR with respect to the axis of material symmetry in relation to the orientation of the well to identify the nature and occurrence of mechanical boundaries and discontinuities such as fractures and bedding planes among other things.

The present disclosure involves an innovative, new system, apparatus and method to specify, in general, the mechanical properties of a rock formation from an analysis of drilling vibrations generated by the cutting action of the bit and the deformation of the formation in response to the forces acting on the rock formation in connection with the drill bit and drilling fluid system while conducting drilling operations. Deformation may include elastic deformation, plastic deformation, and failure of the rock, which may be considered fracturing. Stated differently, aspects of the present disclosure involve obtaining information associated with the drilling of a borehole, while drilling, to identify mechanical rock properties of the formation being drilled. Such mechanical rock properties may be used, in some examples, to identify the presence of natural fractures or rock properties more or less susceptible to stimulation techniques. For example, knowing mechanical rock properties along a borehole or the presence of natural fractures along a borehole may be used to optimize hydraulic fracturing operations by focusing such fracturing on areas where it will be most effective, among other advantages. Mechanical rock properties may include elastic coefficients (e.g., the cij's), strength measurements such as initial yield strength, peak compressive strength, tensile strength YME, PR, shear modulus, bulk modulus, strain-hardening exponents, Thompsen coefficients and other mechanical rock properties.

The Nature of Elastic Coefficients as they Pertain to Fractures

The mechanics of drilling a well provide a natural, in-situ, means to measure the deformation of a rock formation and gather data suitable for determining mechanical rock properties, because the penetration of the drill bit is in and of itself accommodated by repeatedly fracturing the rock formation by using the bit to generate forces on the rock formation that are sufficient to overcome the failure strength of the rock, measurements of such in relation to the methods described here may be used in predictable ways to determine the presence of natural (in situ) fractures, fracture swarms (cluster of fractures), bedding planes, fault boundaries, and other information. In some instances, variations in mechanical rock properties are used to identify fractures, bedding planes and the like.

Elastic coefficients that describe a relatively large deformation in response to the forces acting on a rock formation indicate the rock formation is weaker and less rigid. Therefore mapping the spatial variations of the elastic coefficients provides information where there are zones of weakness in the rock formation. If the nature and occurrence of the zones of weakness in the rock formation as evidenced by changes in the elastic coefficients are localized in space or otherwise discrete relative to the surrounding elastic coefficients that would indicate the presence of a fracture or other mechanical discontinuity. Systematic changes in the spatial distribution of the elastic coefficients as are derived by the method are used to identify mechanical discontinuities and geological boundaries of rock formations such as bedding planes or faults that act to separate or offset rock formation with different rock properties, where the differences in rock properties are evidenced by the nature and distribution of the elastic coefficients.

Figure 1A:
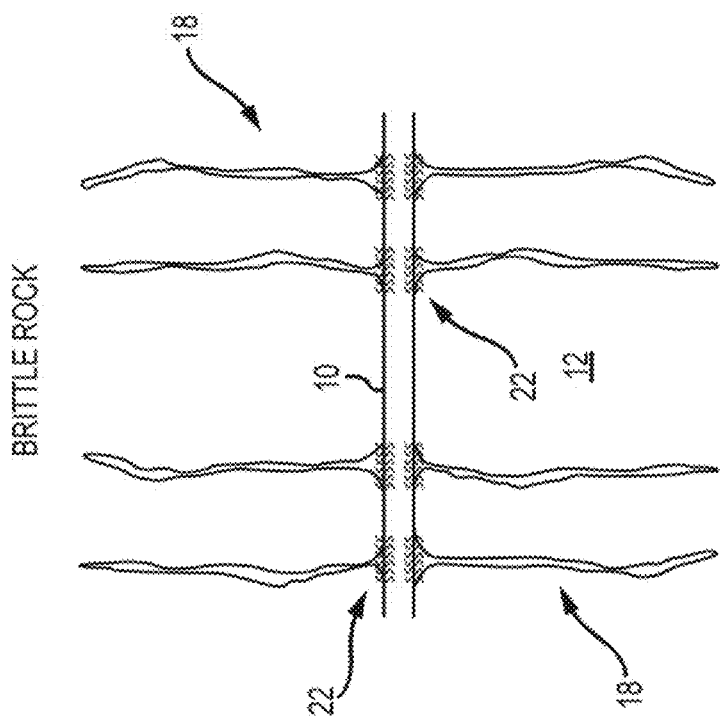

As will be understood from the present disclosure, mechanical strength and deformation of the reservoir rock influences fracture creation, propagation and ability to maintain fracture permeability. FIG. 1 is a simplified diagram illustrating the difference between fractures induced in a relatively brittle rock formation, and which may be include naturally occurring fractures, versus fractures induced in a relatively ductile rock formation, which may include fewer or no natural fractures. As illustrated in FIG. 1A, a horizontal section 10 of a borehole has been drilled through relatively brittle rock 12 and hydraulically fractured. In contrast, FIG. 1B illustrates a horizontal section 14 of a borehole drilled through relatively ductile rock 16 and hydraulically fractured. The fractures 18 created in the relatively brittle rock tend to penetrate deeper into the reservoir than the fracture 20 in ductile rock. Moreover, reservoir rock trending to the brittle end of the normal range tends to have higher initial production rates and lower decline rates. The techniques described in this disclosure will provide new information for selecting hydrocarbon bearing zones by differentiating between brittle rocks generally associated with larger fracture creation and better proppant support that is more permeable than ductile rock that produces smaller, less productive fractures which are prone to rapid compaction and closure and are less permeable. Similarly, techniques discussed herein may also identify areas where natural fractures may exist provide similar advantages as brittle rock. Generally speaking, as will be understood from the disclosure, various mechanical rock properties discussed herein will provide mechanisms whereby rock formations may be characterized, along the well bore, as to the relative brittleness or ductileness, or the relative susceptibility to stimulation techniques along the formation, which may include the identification of existing fractures or at least rock properties indicative of existing fractures Data acquisition techniques FIG. 2 is a diagram of a bottom hole assembly portion 20 of a drill string where the bottom hole assembly includes a drill bit 22, a mud motor 24, a bit sub 26 including various measurement components positioned between the drill bit and the mud motor, and sections of pipe 28 within a horizontal section 30 of a borehole, also referred to herein as a well bore. The vibration data used in the described methodologies may be recorded as close to the source (drill bit) as practical to avoid attenuation through the bottom hole assembly. In one example, vibrations are translated into data from acoustical signals interacting with accelerometers. Similar vibrations data may be collected when drilling through concrete or some other known media, in the vertical borehole section, as discussed in more detail below. One possible location for recording is directly behind the drill bit and ahead of the mud motor using the bit sub, although multiple bit subs may be used along the drill string for geophysical processing of the desired signal. Drilling a wellbore involves using a portion of the weight of the drill string, known as weight on bit (WOB), to push the drill bit into a formation 30. The rotating force on the drill bit, known as torque on bit (TOB), can come from the surface or from a mud motor close to the drill bit. When using a mud motor, drilling mud is pumped down the drill string until it encounters the power drive section of the mud motor where a portion of the mud pressure and flow is converted into a rotational force, which is mechanically coupled to the bit to thereby place rotational torque on the bit 22 to turn the bit. The rotational force on the bit can also be augmented by or come exclusively from mechanisms at the surface on the drilling rig.

The objective of the drilling process is to break the rock down into fragments that are small enough that they can be lifted and evacuated from the wellbore with drilling fluids in order to continue to accommodate the forwards motion of the bit. It should be noted that the action of the drill bit on a rock formation causes the fracturing of the rock formation, which fracturing is experienced as vibrations of the drill, along the borehole to drill the hole, and in the formation immediately adjacent the borehole. Moreover, the drill may encounter existing fractures 34 while drilling. Hydraulic fracturing, in contrast, is a process that occurs during the completion phase by injecting fluid into the borehole, typically with perforation clusters 22 in the casing, to initiate fractures 18/20 into the formation surrounding the bore hole, as illustrated in FIG. 1.

In the illustrated diagram, the bit sub 26 is shown between the bit and the mud motor. The bit sub is a cylindrical component that is operably coupled between the mud motor 24 and the drill bit 22 in a way that allows the mud motor to turn the bit. The bit sub includes a housing, typically in a cylindrical shape, or another mechanism to support various possible measurement components 36 including strain gauges, one or more accelerometers, pressure sensors, which may measure the pressure of the mud flow, temperature sensors which may measure the circulating temperature of the mud or other temperatures and which may be used to provide correction or offset of measurements or calculations that vary with temperature, gyroscopes which may be used to measure inclination and/or directional changes of the bit and string, and/or other components to measure or derive the information discussed herein.

In one example, as shown in FIGS. 2 and 2A, the strain gauges are mounted on the bit sub to determine torque on the bit and the weight on the bit (the force turning the bit and the force pushing the bit into the rock formation). Various possible ways of mounting the strain gauges, or combinations of strain gauges, are possible. Additionally, as shown in FIG. 2A, which is a representative front view of the bit 22, accelerometers are placed to measure axial, rotary, and/or lateral acceleration of the bit. Note, the bit axis is in the center of the circle, whereas axial acceleration may be measured somewhat offset from the axis depending on the placement of the accelerometer. Acceleration measurement may be accomplished by using one or more multi-axis accelerometers. The bit sub, or other such component, may also include a processor and memory to store computer executable instructions to implement various possible methodologies, and possibly preprocess data, as well as a power source which may be one or more batteries. Data storage, such as the memory or other data storage, is also provided to store the collected data. The measurement components, alone or in various possible combinations, may be provided in other locations of the drill string in the general proximity of the drill bit.

Geomechanics in Relation to the Cutting Action of the Bit

FIGS. 3A-3C are a sequence of diagrams illustrating a close up view of a cutter 32 portion of a drill bit in a borehole, slipping, sticking on a portion of rock, and then slipping loose when the forces on the bit are sufficient to overcome the rock causing the rock to fracture and the bit to rotate—collectively referred to as stick slip behavior. The rock deformation mode for a PDC bit is shearing as opposed to a roller cone bit which is punching. Models that describe drilling behavior are in a large part informed on the mechanics of drilling with a roller cone bit and while these models have been extended for the application and use of PDC bits, they suffer uniquely from their inherent inability to reconcile the fundamentally different nature of rock deformation. As will be appreciated from this disclosure, the innovative, new techniques disclosed here seek to advance the application and use of PDC bits, as well as other bits, to characterize mechanical rock properties and in particular for the identification of the nature and occurrences of fractures. The figures describe the depth of cut in relationship to the area and displacement of the fractures created in response to the forces acting on the bit. The cutting action of a particular type of bit but should not be construed to limit the method in the use of other types of drill bits that generate acoustic emissions from rock failure in response to the forces acting on the geometry and configuration of the bit.

More specifically, as the bit turns, the interaction of the bit with the rock formation at any instant in time, produces a complex distribution of forces acting on the formation in connection with the bit and drilling fluid system (e.g., the mud motor) where the orientation and magnitudes of the forces acting on the rock formation are related to the configuration and geometry of the cutters on the bit. Generally speaking, drilling is not a smooth and consistent process. Instead, depending many things including the axial force on the bit, rotational torque on the bit, rock properties, and presence or absence or existing fractures, the bit cuts, gouges, spins, snags, and otherwise drills the borehole in a very complicated and varying fashion. In some instances, the complex distribution of forces acting on the formation is insufficient to initially overcome the strength of the rock formation in relation to the cutting action of the bit and the bit will stop rotating or stick.

As illustrated in FIGS. 3A and 3B, as the cutter begins to stick, the torque applied to the bit increases from a relatively steady value. As the forces, such as the illustrated torque on bit, applied to the bit change either through manual or automated interaction with the surface drilling apparatus or through the non-linear feedback of elastic energy stored within the drilling string or some combination of both, a new weight on the bit (WOB) and torque are delivered to the bit. These forces on one or more particular cutters will continue to load the rock elastically until such point (i) the rock begins to deform plastically and the deformation is concentrated along fracture planes and (ii) when those forces provides a sufficient distribution of forces to overcome the failure strength of the rock formation, the bit will turn and rock, often snapping loose, and drilling will continue. As shown in FIG. 3C, when the forces overcome the rock, the torque will dramatically drop to the relatively steady value, until the bit sticks again. Such a stick slip action may occur at varying frequencies and displacements and make happen one or more times per revolution of the bit per cutter on the bit, thereby resulting in many such cutting behaviors each revolution of the bit.

Regardless of whether and the extent of stick slip behavior is experienced, deformation and failure of the rock cause the bit to vibrate. During rock deformation and in particular when the bit overcomes the rock strength at failure, stored elastic strain energy is released in the form of acoustic emissions. In some instances, the bit is fracturing rock and may intersect fractures and existing mechanical discontinuities. In some instances, the bit may reactivate existing fractures, which may itself generate a distinct acoustical signal in the form of an induced bit vibration.

On the Processing of Drilling Vibrations

As introduced above, drill bits 22 typically include many cutters 32 arranged with a geometry and configuration designed to generate sufficient forces to overcome the failure strength of the rock formation 30 based on the nature of the rock formation expected to be encountered when drilling a well. During a single rotation of the bit, at least one, but typically many of the cutters will overcome the failure strength of the rock formation and produce a plethora of acoustical emissions related to the scraping, cutting, fracturing, and other interactions between the bit and the rock formation. The tool may include various possible mechanisms, including a reed switch or gyroscopes, which measure revolutions per minute and provide information of each rotation of the bit. There are as many as 30 cutter heads, so each rotation may cause hundreds of acoustic pulses.

Because of the stochastic nature of acoustic emissions or in relation to the nearly simultaneous initiation and propagation of multiple fractures at the cutting face, the implementation of the method discussed herein may use statistical methods and signal analysis tools. In one possible methodology, the RMS measurement technique determines the energy of the signal despite the shape of its waveform. This is important because the many simultaneous events will create complex waveforms with constructive and destructive interferences.

Given the stochastic nature of the acoustic emissions generated by the cutting action of the bit, it is expected that the more times the bit turns per unit time, the higher the rate of acoustic emissions. RMS levels obtained for a time window that underwent two revolutions of the bit would be expected to have higher RMS levels than those obtained during one revolution of the bit in the same time window, all other things being equal.

Measurements while drilling show that the bit speed can vary wildly and erratically during drilling operations. In some instances the bit can completely stick and then slip again as more force is gradually applied. If the stick-slip behavior of the drill bit is not accounted for in the geophysical signal processing, then the variations in the fracture measurements may be confused by with variations in the bit speed and not variations in the fracturing behavior of the rock. When the time window used to measure the RMS level of the signals that have been extracted from the drilling vibrations is normalized with respect to the bit speed, where the bit speed is recording using a gyro to sample the changes in position of the bit with respect to time or a magnet which is used to inform the position of the bit with respect to time, this normalized measurement is understood to provide a level of the acoustical emission activity generated by the fracturing of a rock formation in relation to the cutting action of the bit. The time window where data is gathered may be tied directly to bit rotation by having a time window set based on counts of the bit revolution. In other instances, the time window may be set, and the energy (from vibrations) may be normalized to account for some set turns of the bit, such as one turn of the bit.

The implementation of the technique as described uses signal processing techniques, such as Fourier transforms, bandpass filtering or other filtering, or combinations thereof, to calculate the motion of the bit and the forces on the bit from the amplitudes and frequencies of the acoustical signals recorded by the MWD apparatus (e.g. bit sub 22) that are generated in response to the cutting action of the bit (e.g., the drilling vibrations propagate up the drill string as acoustic waves sometimes referred to as collar waves or tool mode, where they are recorded as acoustical signals by the MWD apparatus). Hence, accelerometers capturing acceleration data can be used to obtain information of the forces on the bit. Forces on the bit may also be measured using strain gauges, in one possible implementation. The motion of the bit, which may be recognized as displacements, and the forces on the bit are used to populate a stress/strain relationship that allows the computation of mechanical rock properties. Mechanical rock properties may be analyzed relative to a baseline (such as an average over some wellbore distance) to identify locations where the mechanical properties of a rock formation change as the bit encounters a mechanical discontinuity or other geological discontinuity all other things being equal. In some instances, rock properties may be used to identify such locations through computations based on assumptions of the rock formation, and comparisons thereof, or otherwise.

Referring to FIG. 4, to account for the effects of the drilling efficiencies and the possibility of stick-slip behavior while conducting drilling operations, in one specific implementation, the method may use measurements of the drilling efficiencies, such as revolutions per minute (RPM) to normalize the geophysical signal processing of the drilling vibrations in order to compare the results of the signal processing along the length of the borehole in accordance with the methods provided. It is understood through the normalization that the variations in the signal levels, such as the RMS levels, are now corrected in account of the changes in drilling efficiencies along the trajectory of the borehole.

As such, the RMS levels, obtained as shown above, for example, are related to changes in the mechanical rock properties while the drill intersects areas of differing properties. Stated differently, it may be helpful to compensate or normalize for changes in the rotational speed of the bit (RPM) by using a time window commensurate with the rotation of the bit. Such normalization may also be useful to correct the geophysical signal processing in accordance with drilling operations where the drill string is rotated from surface in conjunction with the mud motor turning the bit, as opposed to situations where the mud motor is operating but the string is sliding not being rotated from the surface.

In a further elaboration of the method, the signal processing techniques systematically relate measurements of the forces acting on a rock formation in connection with the drill bit and drilling fluid system (stress) to the variations in the fracturing of a rock formation in response to the cutting action of the bit (strain) to obtain innovative, new stress-strain relationships where the application and use of the stress-strain relationships allow for the derivation of elastic coefficients for the stress-strain relationships. Relative variations in either one or a combination of the elastic coefficients may be used to identify the nature and occurrence of fractures, fracture swarms and other mechanical discontinuities and geological boundaries such as bedding planes and/or faults that offset or otherwise separate rock formations with different mechanical rock properties.

Accounting for the drilling efficiencies is also a consideration in the implementation of the approach, because the wear on the drill bit as the rock formation is drilled will change the configuration and geometry of the cutters on the drill bit. The mechanical wear of the drill bit will affect the distribution of the forces acting on the formation in connection with the drill bit and as the well is progressed, the manual or automated application of forces on the drilling apparatus change to account for the wear and tear of the bit.

The application and use of the stress-strain technique according the method employed herein is understood to normalize the effects of reduced drilling efficiencies caused by bit wear on the derivation of the mechanical rock properties because the forces used in the stress-strain relationship are obtained from the forces acting on the bit, where the forces needed to overcome the strength of the rock are increased in relation to the penetration or depth of cut of the worn bit tooth into the formation.

The acoustical emissions associated with the deformation and failure of the rock formation while drilling are generally too minute and/or too attenuated by the intervening rock to be detectable at the surface (which may be hundreds or thousands of feet above the borehole). Because of the amount of energy released is generally expected to be slight and of relatively high frequency, the radiated waves are best viewed when transmitted from the cutting face through the bit and bottom hole assembly where they propagate along the drill string through acoustically conductive steel as a direct tool arrival and contribute to the vibration of the drill string. The drilling vibrations can be recorded on instrumentation that is sensitive to their nature and presence. Stated differently, one aspect of the present disclosure involves a drilling tool assembly including sensors and processing electronics (e.g., the accelerometers and/or strain gauges in the bit sub 26 proximate the bit 22) that are positioned to detect and record the radiated waves from the drilling induced fracturing, which may further involve identification and/or characterization of existing mechanical discontinuities, such as fractures or geological boundaries, such as faults or bedding planes.

A Specific Data Logging Technique

In one specific implementation, a form of measurement while drilling (MWD) system or tool is employed. The MWD system uses sensors designed to measures vibration. The MWD system may also measure forces on the bit, and other parameters such as bit speed, which may be expressed as revolutions per minute, the fluid pressures, and temperature of the drilling mud or environment proximate the bit sub. The system may also include gyroscopes to obtain the orientation of the cutting face of the drill bit, in some implementations. In one specific embodiment, the MWD tool includes at least one receiver, which may include accelerometers mounted on or proximate the bottom hole assembly to record the drilling vibrations and associated acoustic emissions. In some implementations, the MWD may further include electrical, mechanical, and/or other filtering mechanisms to processes the data to remove unwanted noise or to record the data without unwanted noise. In certain instances, stages of filtering may be applied both prior to recording, and after recording but prior to processing, to remove unwanted data, or as much as necessary or possible. In an alternative enablement, the signals may be transmitted to the surface for storage and processing. In some applications it may be desirable to process the acoustical signals, such as through the processor, on board the logging tool for transmission of the significantly data-reduced processed signal to surface in real time.

Once the drilling dynamics data is collected and processed, the results are correlated back to the measured depth of the well using precise measurements of the length of drill string components as they are lowered into the well. Gamma ray LWD and casing collar measurements can further be used to correlate the absolute location of data processed from the BHA collection point or points to determine a more reliable location of the bit in relation to the subsurface.

Noise Attenuation Techniques

Because of the amount of energy released is generally expected to be slight and of relatively high frequency, the radiated waves are best viewed when transmitted from the cutting face (with cutters 32) to the bit and bottom hole assembly, where they may further propagate and are known as the direct tool arrival or collar wave and contribute to the vibration of the drill string. The acoustic emissions may be measured by accelerometers, transducers, or other devices sensitive to particle motion.

Drilling induced vibrations that are generated by the interaction of the bit with the rock formation will have harmonic frequencies that are related to the rotational speed of the bit. Most of the harmonic vibrations are expected to be low frequency. The amplitudes of the acoustical emissions in the frequency ranges of the harmonic frequencies are usually much less than the amplitude of the harmonic drilling vibrations. In one implementation, the harmonic drilling vibrations are removed by a filter, such as a high pass filter or bandpass filter, which may be implemented in the bit sub processor, or may be applied to the stored data for later processing after download of the data from the bit sub memory, that passes signal frequencies that are higher than frequencies related to the harmonic drilling vibrations, and which may also eliminate frequencies above those possibly related to fracture characteristics. Other filter types and frequency characteristics will be possible depending on various factors including, but not limited to, the rotational speed of the bit, the type of bit, the rock characteristics, the positioning of sensors, mud motor characteristics, and other attributes.

Another consideration with respect to the variations in the amplitude and frequency of the acoustic emissions is the interference of the direct tool arrival by the generation and transmission of other wave modes that are also excited by the drilling operations including the wave modes excited by the release of energy from the fracturing of the rock formation.

In addition to the acoustical emissions created by the fracturing of a rock formation in response to the cutting action of the bit, the drilling vibrations that are being recorded will also generate wave modes that propagate though the formation surrounding the wellbore and the fluids within the wellbore that can interfere with the acoustical emissions that are related to the fracturing of a rock formation at the cutting face and bias the measurements of the mechanical rock properties. For some frequencies, the other wave modes will have higher amplitudes than the amplitudes of the acoustical emissions at that particular frequency. These other wave modes will result from the propagation of various guided waves in the drilling fluid between the bottom hole assembly and the wellbore such as Stonely waves, tube waves and direct fluid waves such as the fluid compressional waves. Other wave modes that can interfere with the direct tool arrival are surface waves that propagate and refract energy along the interface between the well bore and the fluid such as compressional head waves, surface compressional waves and shear body waves. These waves all have the potential to interfere with the propagation of energy from the direct tool arrival and if their presence is included in the signal processing could bias the calculations related to the amplitudes and frequencies used to describe the nature and occurrence of the fracturing.

To decrease the possibility of interference with the other wave modes, in one embodiment the sensor is mounted internally using in a plug which will effectively isolate the sensor from the wave modes propagating through the formation and through the fluids. For example, in the case of accelerometers, the accelerometers are mounted within the bit sub (or other component). External waves that are carried by the formation and fluid in the annulus 36 will therefore be mechanically isolated by the internal position of the sensor relative to the other waves. An internally mounted sensor will be respond mainly to the vibrations related to direct tool arrival (the vibrations caused by the interaction of the bit with the formation).

Because the steel used in the construction of a bottom assembly has a significantly higher quality factor, Q of 10,000, that rock formations and fluids where Q ranges are typically from 1 to 100, the waves that propagate along the collar known as the collar wave or tool arrival will experience much less attenuation than signals recorded by the sensor that have traveled through the formation or the fluid media. Because of the low attenuation of the waves propagating along the steel drill collar relative to the waves propagating through the formations and drilling fluids, it could also be possible to naturally attenuate the various unwanted modes of propagation by placing the receiver at a distance that is far enough away from the bit to attenuate the other unwanted formation and fluid wave modes that will interfere with the direct tool arrival, but not so far as to lose the valuable high frequency information carried by the collar wave or tool wave that is needed to be recorded to calculate the size and displacement of the fracturing. The distances needed to attenuate the unwanted modes can be determined by expressions that relate the energy loss per cycle during transmission for a given quality factor. In this embodiment the location of the bottom hole assembly in relation to the location of the bit is placed at a distance behind the bit to achieve this attenuation. Alternatively or additionally, to avoid the interference of fluid and formation arrivals with the collar arrival the receiver may be coupled to the drill string at the surface of the well where the drill string has yet to enter the subsurface and borehole that contains the drilling fluids.

In another embodiment, a plurality of receivers are arranged along the string behind the drill bit to record the acoustical signals generated by the release of elastic energy at the cutting face. In one example, the receivers are spaced within centimeters or millimeters and may be placed in array mounted on a portion of the bit sub. The spacing of the receivers may form an array, with the spacing determined by the frequency range of the acoustical signals and the velocity of propagation in the steel or other material. Because the velocity of propagation in the steel is typically much faster than most formation and fluid velocities which control the nature of propagation of the interfering modes and is known with a high degree of certainty, spatial filters such as FK filters that pass signals that propagate at velocities that are consistent with wave transmission through steel and attenuate events with slower velocities. These filters can be used to separate the direct tool arrival waves from the other interfering waveforms. When using an array of receivers the signal-to-noise ratio can be further increased by using geophysical signal processing techniques to filter the data by stacking the signals over the array. The nature of the stacking depends on the configuration of the array of receivers and whether the receivers are deployed in a linear, bipolar or radial array.

In some instances the stacking can be used to isolate various modes that are propagated by the tool arrival, such as the compressional wave, transverse wave or quadrupole wave. These other tool modes can also be processed using geophysical signal processing techniques to determine the fracturing of a rock formation in relation to the cutting action of the bit.

The quadrupole is a direct tool mode that does not propagate direct tool arrivals above a cutoff frequency, where the cutoff frequency is related to the diameter and thickness of the steel. The amplitudes and frequencies of these other modes provides useful though otherwise band limited information that may be used in relation to the geophysical signal processing techniques in order to specify how the size and displacement of the fractures would be responsible for generating these other wave modes.

The analysis of the signals extracted from the drilling vibrations should not be limited to the case of the amplitudes and frequencies of the direct tool arrival. In another embodiment, the receiver array can be used to reject the direct tool arrival or collar wave and pass other arrivals related to other modes of transmission, where the modes of transmission may be through the rock formation or drilling fluid system based on their velocity of propagation and frequency content through the media. These other modes of propagation may be used in preference to the direct tool arrival when the other modes of wave propagation contain signals related to the fracturing of the formation in relation to the cutting action of the bit that are of interest to the variations of the RMS levels of the signals as described by the method.

The Application and Use of Microseismic Signal Processing Techniques in Relation to the Method In a further elaboration of the method, drilling vibrations generated by the cutting action of the bit may be processed using geophysical signal processing techniques that are conventionally recognized as appropriate for the analysis of microearthquake source mechanisms. In one example, the depth of cut or penetration per revolution of the bit is obtained by using signal processing techniques to measure the sizes and displacements of fractures that result from the deformation and failure of the rock formation in relation to the cutting action of the bit, to estimate the zero-frequency level (ZFL) of the displacement spectra. The ZFL of the displacement is the static offset level here understood to represent the penetration of the bit. Under this consideration and in relation to the technique it provides high resolution motion of the bit that is taken to be the depth of cut or penetration of the bit for each revolution of the bit.

Figure 5A:
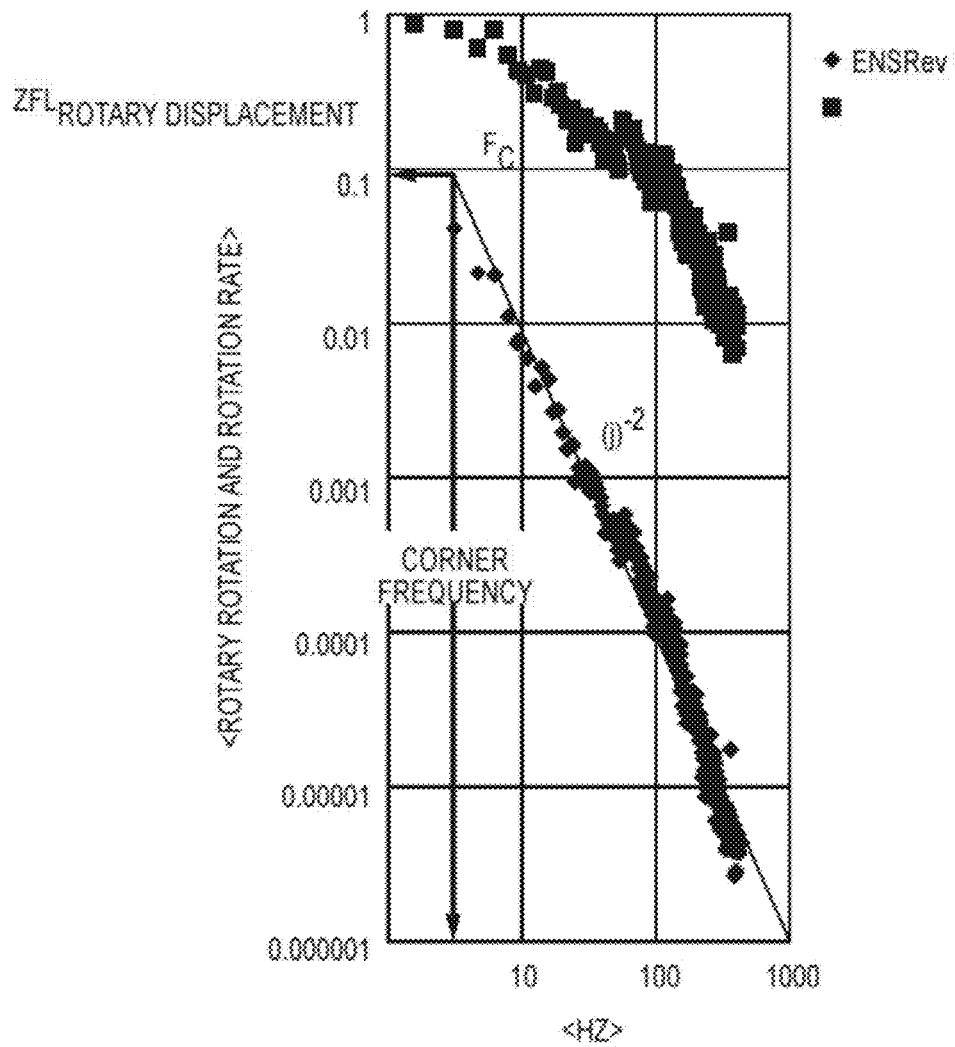
FIG. 5A is a rotary displacement spectra obtained from measurement while drilling data.
Figure 5B:
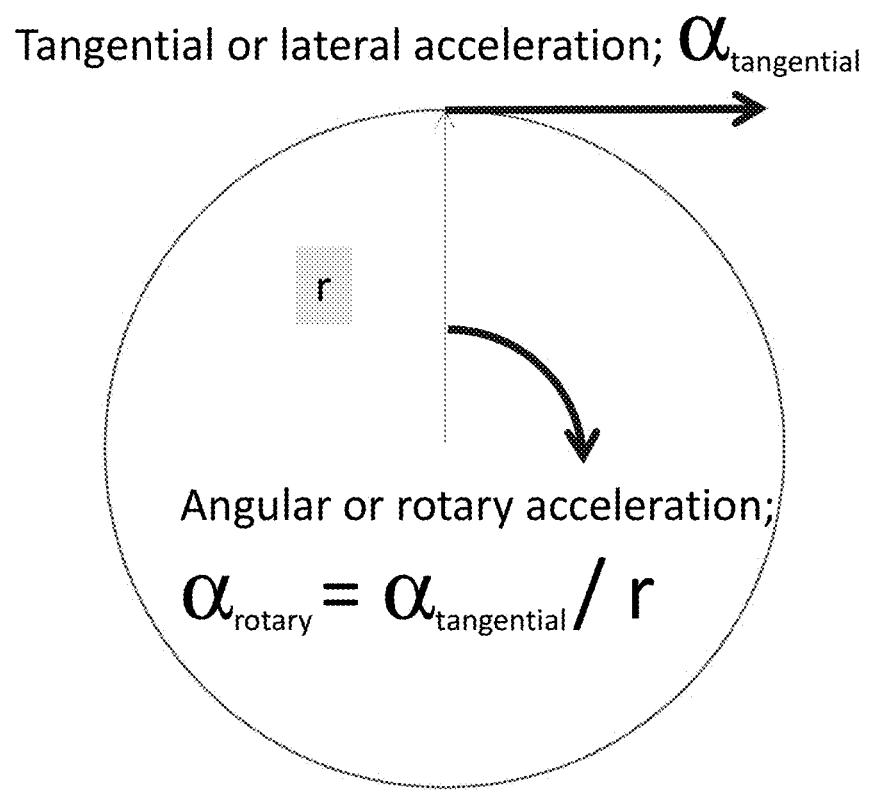
FIG. 5B is a diagram illustrating lateral and rotary acceleration of the bit, while cutting, and useful in computing mechanical rock properties among other advantages.
Figure 7:
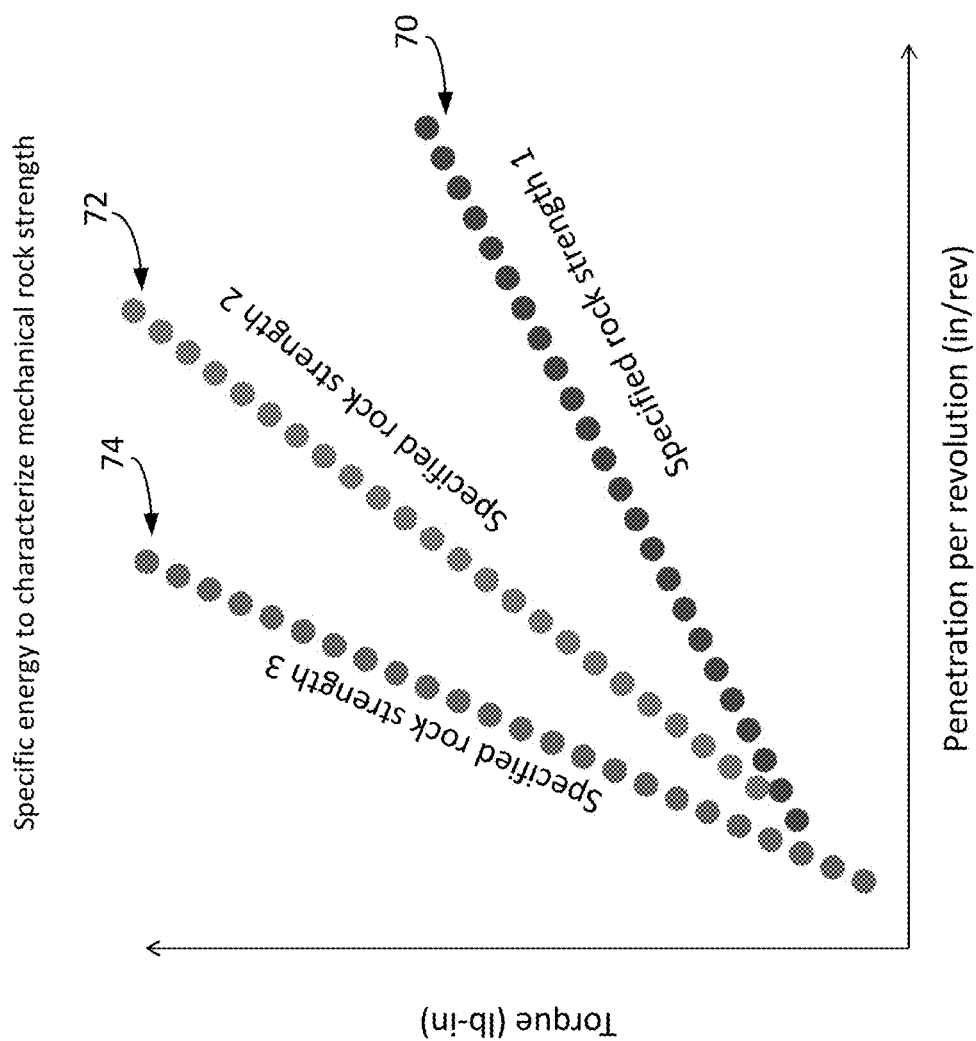
FIG. 7 is a graph of rock strength curves computed from torque and penetration per revolution information based on measurement while drilling data.

FIG. 5 illustrates a displacement spectra for one revolution of a bit. The graph of displacement spectra has a y-axis of rotary displacement amplitude at a range of frequencies (x-axis) over which amplitude measurements are taken (based on the sampling frequency.) The displacement spectra is obtained by integrating the Fourier transform of the time domain measurement of the acceleration data (bit vibration data) twice in the frequency domain, or the angular velocity time series once where it is understood that the accelerations may be axial, lateral, rotary or a combination of those channels. Rotary displacement may be in the form of radians. The ZFL (zero frequency level) determined by the method is where the displacement spectra theoretically intersects the zero-frequency axis. The ZFL is directly proportional to the average displacements of the fractures initiated by the bit, and to the displacement of the bit per revolution.

Generally speaking, because high resolution displacement data is achievable, the system can detect relative changes of displacement per revolution of the bit or displacement per time or rate of penetration (ROP) and thereby determine when a fracture is encountered as the displacement will be greater relative to areas where fractures are not encountered. With respect to the method, the increase in displacement would indicate a change in the hardness of the formation, where hardness increases with displacement all other things being equal.

Observations of strong ground motion generated by earthquakes suggest that the time series recordings of the P- and S-wave signals can be reasonably and effectively treated as band limited white noise where the amplitudes and frequencies of the signals are controlled by the interaction of many smaller faults and fracture patches rupturing simultaneously and the band limitations in the absence of attenuation are related to the displacements and rupture dimensions of earthquake source. Therefore, observations involving the simultaneous occurrence of multiple acoustic emissions generated by fracturing at the face of the bit and then transmitted through steel where the signals are expected to undergo little attenuation indicates that the application and use of models that are generally used to describe the source mechanisms of an earthquake can be used to describe the aggregate sizes and displacements of many fractures being generated simultaneously from the repeated turning of the many cutters on the drill bit when overcoming the rock strength to accommodate the motion of the bit.

The estimation of the size and displacement of the fracturing generated by the cutting action or motion of the bit follows directly from the display of the data that is present in FIG. 5. Here the model for representing the microearthquake source mechanism that estimate the size and displacement of the fracturing typically involves the application and use of a two parameter spectral model where here the two parameters used to describe the model are the zero-frequency level of the displacement spectra and the corner frequency. It should be appreciated that other source parameter models such as the RMS stress drop that also use the amplitude and frequencies of the signals to estimate the size and displacement of fracture and can also be considered and the use of a two parameter spectral model should not limit the scope of this method.

In the two parameter model of the microearthquake source mechanism, the displacement of the bit as determined by the displacements on the fractures is related to the zero frequency level of the displacement spectra. The zero frequency level of the displacement spectra is the same as the static offset. The low-frequency content may be modified by the receivers and electronics used to record the signals on the MWD assembly and the possible use of band pass filters in relation to the signal processing to eliminate the low frequency drilling harmonics. The technique has advantages because it (i) provides an estimate of the ZFL using band-limited data that may not always be reliable in the lower end of the amplitude spectra, (ii) provides a reliable technique to objectively select the ZFL without manual or visual biases, (iii) can be automated in a computer implemented fashion to handle the large volumes of data typically collected by an MWD apparatus as used to collect data in relation to the method.

Geophysical signal processing techniques that use relationships between the power spectral density of the displacement and velocity spectrum are used to calculate this value (ZFL) based on the functional mathematical representation of the earthquake source spectra as described by the two parameter spectral model of the earthquake source provide an objective technique to overcome the expected poor signal to noise ratios of the low frequency acoustical information.

Thus, ZFL is understood to represent the displacement or penetration of the bit. In one specific example, the ZFL is a measurement of the displacement (e.g., in millimeters or inches or angular displacements such as a radians) of the bit per turn of the bit. If the displacement is the axial displacement per revolution of the bit, then this displacement can be used to inform a depth of cut in terms of displacement per revolution. If time taken to make the one turn of the bit is used to describe the axial displacement or penetration of the bit, then it is taken that this may be used to determine rate of penetration. Typical depths of cut as estimated by the method range from 0.01 inches per revolution to 0.1 inches per revolution The size or the radius of the fractures can also be determined by the frequency content of the acoustical signal. Signals with higher frequency content generally correspond to smaller fracture areas. This characteristic of the frequency spectra that is used to determine the size of the event is typically referred to as the corner frequency (FIG. 5). There is a linear, relationship between the corner frequency of the displacement spectra and the size of the event. Because of attenuation of the signal during the transmission, estimates of the corner frequency may be compromised if the sensor is placed too far from the bit. Thus, having the sensors as close to the bit as possible, or at least not so far that attenuation is significant, may be a consideration for some implementations discussed herein. Limitations in the sensor and the recording electronics and the filters employed to extract the signals may also limit the useable bandwidth.

Geophysical signal processing techniques that use relationships between the power spectral density of the displacement and power spectral density of the velocity based on the functional mathematical representation of the earthquake source spectra as is described by the two parameter model of the earthquake source that can be used to calculate the corner frequency. A relatively high corner frequency may represent unfractured rock whereas relatively lower corner frequency may indicate the presence of a fracture.

When the bandwidth is limited, the minimum fracture size detected will be set to a threshold based on a cutoff frequency. Any fracturing of a rock formation below this threshold will not contribute to the determination of the fracturing of the rock formation and the deformation of the rock formation. Thus, in the application of the method, some rock formations may undergo fracturing in response to the cutting action of the bit where the fracturing is not detected by the method employed here, either because the frequencies of which to fracture energy occur are too high or the signal to noise ratio is too low. The occurrence of these scenarios would suggest that the bit is not effectively penetrating the formation and that the rock properties derived in this instance would represent the limiting rock properties and limit the specification of the deformation of the rock in response to forces generated by the emplacement of hydraulic fractures where any such deformation in relation to the cutting action of the bit would be taken as insufficient to do so.

In order to make meaningful comparisons of the fracture sizes and displacements along the well bore, the time window that is used to process the signals extracted from the drilling vibrations is based on the bit speed, in one specific implementation. One way to normalize the time window relative to the bit speed is to specify the time window according to the time needed to make one revolution of the bit. If the bit speed were 120 RPM then the time window would be 500 ms, while if the bit speed were 60 RPM then the time window would need to be 1000 ms to obtain an equivalent measurement of the fracturing generated in response to the cutting action of the bit. Another way to normalize the time window to account for variations in the bit speed along the wellbore would be to normalize the temporal frequency of the spectral density by converting from cycles per second to cycles per revolution. At a bit speed of 120 RPM, the bit would make two revolutions in a second and therefore at cycle per second would be normalized to two cycles per revolution, while a bit speed of 60 RPM would make one revolution in a second therefore one cycle per second would be normalized to one cycle per revolution. In one embodiment, the BHA is instrumented to measure the bit speed at sufficient resolution to specify either a time window equivalent to one rotation of the bit or normalize the spectral density by converting the temporal frequency to cycles per revolution.

As such, the spatial variations in the measurements as obtained through a combination of one or more of the measurements such as the RMS acceleration or the sizes and displacements of the fractures are understood to correspond to the nature and occurrence of deformation and failure in relation to the cutting action of the bit and as such are taken to represent the spatial variations in mechanical rock properties. So, an increasing value of ZFL, relative to a baseline, represents the intersection of the bit with zone of mechanically weaker rock that may be determined to be a fracture, swarm of fractures (e.g., fracture 34) in accordance with for example a stress-strain relationship. Therefore, the geophysical signal processing techniques employed by the method may involve statistical descriptions such as measuring the RMS level of the acoustical emissions or the application and use of geophysical signal processing techniques that are generally recognized as appropriate for the analysis of microearthquake source mechanisms to describe the deformation and failure of a rock formation in relation to the cutting action of the bit, where the spatial variations in the measurements (e.g., changes in ZFL or corner frequencies) relative to some average or baseline level are used to identify mechanical discontinuities or geological formations as they are encountered or crossed by the bit.

In another embodiment, referring now to FIG. 6, the geophysical signal processing methods may obtain measurements related to the instantaneous change in the inclination of the bit relative to the average direction of the bit to describe a mechanical discontinuity or geological boundary. Instantaneous change in inclination of the drill bit relative to a long-term average inclination can be obtained using a sensor or an array of sensors configured to record and extract acoustical signals in relation to the independent spatial axes of the drilling vibrations. The magnitude of the deflection of the inclination of the drill bit relative to a long-term trend in the direction of the drill bit depends on the orientation of the mechanical discontinuity or geological boundary with respect to the cutting face of the drill bit and therefore the deflection is understood to indicate a change in the mechanical rock properties. So, for example, with a multi-axis accelerometer measuring axial acceleration and lateral or rotary acceleration of the bit, the ratio of the axial and lateral or rotary displacements may be treated as an inclination, as illustrated in the respective inclination logs 60 (prior to the fracture, while the bit 22 intersects the existing fracture 34). The lateral or rotary acceleration will increase relatively when the bit is deflected from axial movement, such as when the bit encounters an angled discontinuity transverse the borehole.

The Concept of Specific Energy in Relation to the Method

In addition to acoustical information that informs the displacement of the bit, aspects of the present disclosure may further involve force information. While conducting drilling operations the energy defined as the energy needed to remove a volume of rock is useful to describe the efficiency of the drilling operation. The specific energy is a term that describes the minimum amount of work needed to remove a certain volume of rock. Descriptions of the specific energy are useful to understand the variations in rate of penetration or the depth of cut in relation to the forces acting on the bit. Unlike conventional methods, the specific energy here may be calculated from the aforementioned acoustical processing techniques in and of themselves or in conjunction with measurements of torque on bit and/or force on bit.

The size and displacement of the fractures that form in response to the cutting action of the bit controls depth of cut into a rock formation and subsequently the rate of penetration of the drill bit through a rock formation. In a method described here, the work done per the volume of rock removed is determined by the displacement of the fractures as multiplied by the area of the bit. The work is computed from the forces acting on the bit multiplied by the displacement of the bit. As discussed above, the displacements of the bit are obtained through the analysis of the drilling vibration using geophysical signal processing techniques that are appropriate for the analysis of microearthquake source mechanisms as is provided by the above discussed method.

There are two components of the specific energy: one that is normal to the bit and another that is tangential to the bit or rotary energy. Because the rotary specific energy is proportionally related to the torque per unit of displacement, it provides a measure of the rock strength or the minimum energy needed to drill and the application and use of the rotary specific energy in this regard takes the form of a stress-strain relationship (FIG. 8 and others).

In the method provided here, the displacement of the bit as it relates to the fracturing of the formation is evidenced through the RMS level of the measurements or the displacement of the bit is evidenced by the displacement on the fractures as provided through the microearthquake source parameter measurements and the volume of rock removed is proportional to the fracture areas and the fracture displacement are averaged over all of the fractures provides in the period of time processed for the time period that is analyzed for example in a single turn of the bit. In one embodiment of the method, the volume of rock excavated is specified by the product of the aggregate area of the fractures and the average displacement of the fractures removed by one turn of the bit.

For a bit that is turning at a rate of 120 RPM this would involve using a time window of 500 ms to the average area and average the displacement for one revolution of the drill bit. It should be appreciated that in instances when the rock properties are varying slowly or the MWD measurements are updated at rates less than the time period of one bit revolution the method is not limited to periods that are specified by the turning rate of the bit.

The rotational specific energy is the torque over the average fracture displacement per revolution as obtained by the analysis of the vibration data disclosed by this technique, provides a novel, innovative stress-strain relationship (FIG. 8 and others). For a given rock type, this is expected to be a linear relationship where the slope of the line is related to an elastic coefficient describing the strength of the rock (e.g., specified rock strength 1 (70), specified rock strength 2 (72), and specified rock strength 3 (74)). Because the measurements are obtained while drilling, the strength of the rock actually determined by and is intrinsically related to the fracturing in response to the cutting action of the bit. When using a polycrystalline diamond compact (PDC) bit, for example, the strength of the rock determined from this stress strain relationship would be directly related to the shear strength of the rock. Stress-strain measurements obtained using the method disclosed can be used to characterize the elastic coefficients of the rock formation.

Innovative Stress Strain Relationships as are Provided by the Method

The stress strain relationships employed by the method are populated from measurements taken while drilling. In one instance, the strain is understood to be related to the depth of cut or the penetration per revolution of the bit which is determined by differencing the spatial location at two instances in time versus the number of revolutions taken for the bit to travel that distance. In accordance with the methods set out here in, where (i) the drilling vibrations are understood to represent the deformation and failure of a rock formation in response to cutting action of the bit in order to accommodate the forward motion of the bit through a rock formation, and (ii) the drilling vibrations as processed through the signal processing techniques to evidence the motion of the bit per turn of the bit are understood to represent strain and (iii) the RMS acceleration as obtained through the geophysical signal processing techniques to evidence the forces acting on the bit per turn of the bit are used to populate the variable in relation to a stress-strain constitutive equation. In a further elaboration, these strain measurements can be related to the forces such as the weight on bit and torque on bit acting on the formation in connection with the bit and drilling fluid system to provide a diagram of a general stress-strain relationship. By relating the orientation and magnitude of the stress with respect to the orientation and magnitudes of the strain, where the orientations and magnitudes of the stress and strain are related to the geographical coordinates of the well, multiple stress-strain relationships can be established to determine the elastic coefficients of a rock formation. Where the well is drill perpendicular to the maximum horizontal compressive stress, it is understood that these stress-strain relationships are expressed in the principle axes.

In general, the deformation of a homogeneous isotropic rock formation can be specified by two elastic coefficients. As the complexity of the rock formation increases through the presence of mechanical discontinuities and geological boundaries, the number of elastic coefficients needed to fully describe the deformation of a rock formation in response to the forces acting on the formation in general increases.

The simplest elastic coefficient would be to relate the WOB to the strain generated by the cutting action of the bit where the strain is the displacement in relation to a length made by one turn of the bit where the time windows used for the geophysical signal processing techniques are related to the bit speed. In one preferred embodiment of the method, the WOB would be obtained from the RMS acceleration, where the component of acceleration is oriented parallel to the borehole and as is illustrated.

Figure 8A:
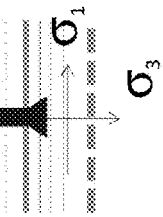
FIG. 8A illustrates stress strain relationships based on an orientation of a well relative to a transverse isotropic axis of material symmetry and mechanisms whereby measurement while drilling techniques may be used to compute elastic coefficients, from which temporal and/or spatial variations in one or a combination of more of the measurements obtained from the geophysical signal processing techniques are used to identify the nature and occurrence of fractures, fracture swarms and other mechanical discontinuities (boundaries) such as bedding planes and/or faults that offset or otherwise separate rock formations with different mechanical rock properties.
Figure 8B:
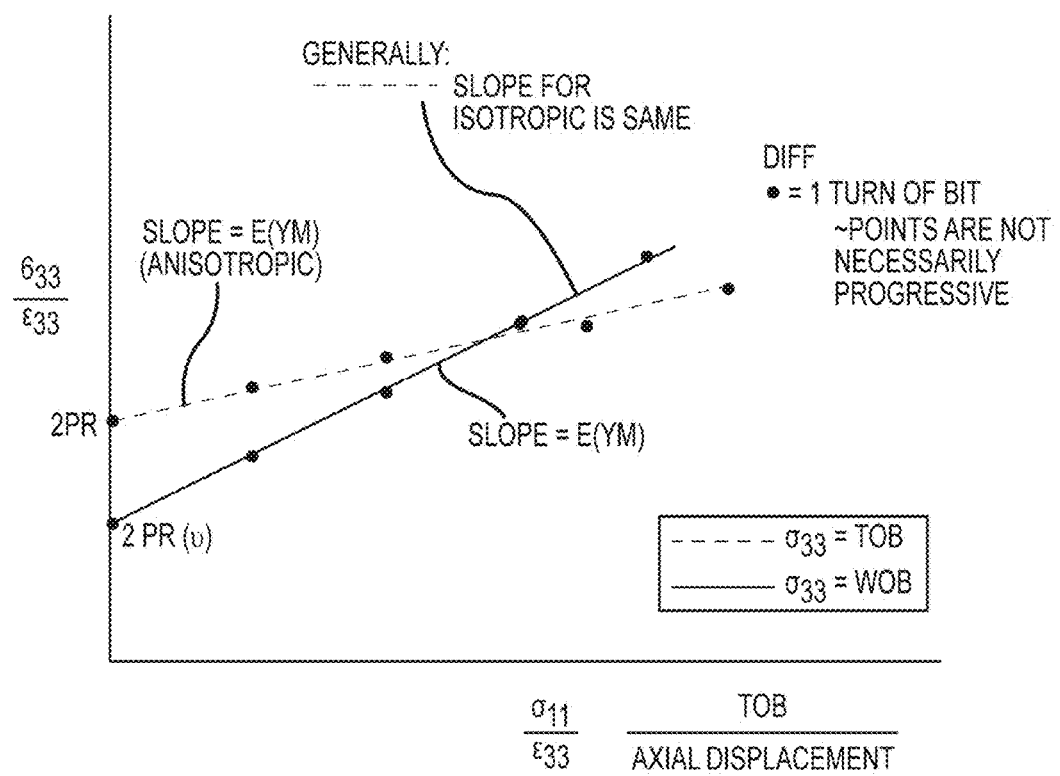
FIG. 8B is a stress strain curve reflecting the relationships of FIG. 8A.

For a transverse isotropic (TI) media, the stress strain relationship constitutive equation is illustrated in FIG. 8A (using MWD data) with attendant PR intercept and YME slope information illustrated in the curves of FIG. 8B.

Where:
E is Young's Modulus of Elasticity (YME),
v is Poisson's ratio (PR)
$\sigma 1$=TOB
$\sigma 3$=WOB
$\varepsilon 3$=Axial displacement spectra ZFL This stress-strain relationship would in general be proportional to a Young's modulus of elasticity where YME is determined parallel to the direction of drilling. The method allows for the determination of elastic coefficients for transverse isotropic elastic media, where the assumption of transverse isotropic elasticity is understood to be reasonable approximation to describe the rock deformation by obtaining the stress-strain relationship to the orientation geological boundaries with respect to the inclination of the bit of the well being drilled. This could be accomplished using FIG. 8 or FIG. 10C where the elastic coefficients as described are proportional to Young's Modulus and the Poisson's ratio of a rock formation.

Figure 9A:
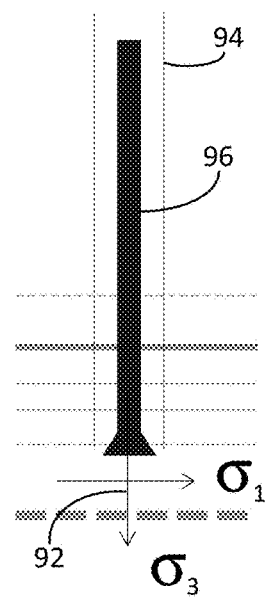
FIG. 9A illustrates a constitutive stress strain relationship for an axis of material symmetry parallel a well axis, and computations using torque on bit, weigh on bit and axial displacement to obtain elastic coefficients from measurement of bit vibration and/or forces acting on the bit.
Figure 9B:
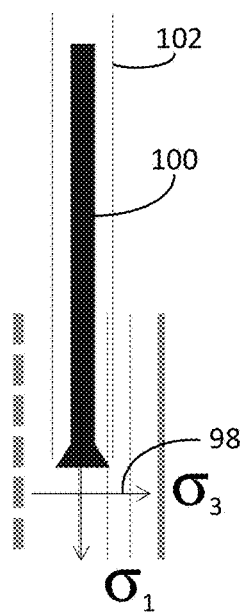
FIG. 9B illustrates a constitutive stress strain relationship for an axis of material symmetry perpendicular a well axis, and computations using torque on bit, weigh on bit and rotary displacement to obtain elastic coefficients from measurement of bit vibration and/or forces acting on the bit.

In another implementation more particularly shown in FIGS. 9A and 9B, the rock strength is specified by the stress-strain relationships based on the orientation of the well in relation to the bedding planes of the hydrocarbon bearing formation and the orientation of the well with respect to the principle axes of tectonic stress or the state-of-stress acting on the rock formation. This method allows for the determination of elastic coefficients for a transverse isotropic (TI) elastic media, where the assumption of transverse elasticity is taken as a reasonable approximation to describe the rock deformation by obtaining the stress-strain relationship to the orientation geological boundaries with respect to the inclination of the bit of the well being drilled. This could be accomplished using the above description where the elastic coefficients as described are proportional to Young's Modulus and the Poisson's ratio of a rock formation.

The loading conditions on a rock formation are given by the forces acting on the rock formation in connection with the drilling apparatus (e.g., weigh on bit and/or torque on bit) and drilling fluid system (e.g., annular pressure) and the deformation of the rock formation are described by the displacements of the bit (e.g., axial and lateral or rotary displacements as measured by accelerometers in the bit sub). The constitutive equations are described with respect to transverse isotropic media. As shown in FIG. 9A-9B, transverse isotropic media involves a layering of media (sometimes referred to as "layercake"). Transverse isotropic media involves a layering of media that is normal to a plane of isotropy—meaning the media is relatively uniform around the axis of symmetry. FIG. 9A illustrates a case where the axis 90 of material symmetry is parallel to the borehole 94 (and parallel to the bit axis 96 drilling the borehole). FIG. 9B illustrates a case where the axis of material symmetry 98 is perpendicular to the borehole. In one possible implementation, it is assumed that the media is either vertically transverse isotropic (VTI) or it is horizontally transverse isotropic (HTI). VTI is a case where the axis of symmetry is vertically oriented (layers are horizontal with respect to the free surface). HTI is a case where the axis of symmetry is horizontally oriented (where the anisotropy is understood to involve a layering of the formation that is vertical with respect to the free surface and further where it is understood that fractures represent a case of vertical layering with respect to the free surface). Thus, in the case of a vertical well, FIG. 9A illustrates vertical transverse isotropy (the vertical borehole is parallel to a vertical axis of isotropic layer symmetry) and also illustrates, in the case of a horizontal well, horizontal transverse isotropy (the horizontal borehole is parallel to a horizontal axis of isotropic layer symmetry). In contrast, in the case of a horizontal well, FIG. 9B illustrates vertical transverse isotropy (the horizontal borehole is perpendicular a vertical axis of isotropic layer symmetry) and also illustrates, in the case of a vertical well, horizontal transverse isotropy (the vertical borehole is parallel a horizontal axis of isotropic layer symmetry).

FIGS. 9A and 9B also illustrate the variables for the constitutive stress-strain equation (FIG. 8 and FIG. 10C) of a transverse isotropic media. The stress strain variables are populated based on either (i) force measurements (e.g., from strain gauges) and/or (ii) the acceleration measurements (e.g., from accelerometers) or populated only form acceleration data. More specifically, in the first case, the stress-strain variables are populated with data related to WOB, TOB or axial or lateral or rotary displacements. In the second case, the stress strain variables the forces are populated with axial and lateral or rotary acceleration data, and the strain from the axial or lateral or rotary displacements (which may be available by integrating the axial or lateral or rotary acceleration spectra twice in the frequency domain). Generally speaking, Poisson's ratio (and/or Young's modulus) is computed from stress-strain constitutive equations populated from measurements taken while drilling along a borehole under the assumption that the transverse axis of material symmetry is parallel to the borehole (FIG. 9A) and under the assumption that the transverse axis of material symmetry is perpendicular to the borehole (FIG. 9B).

When the rock formation (media) is isotropic, the two equations will generate values of PR or YME that generally track each other, meaning that under either assumptive case, the drill bit will react similarly as it drills through relatively uniform rock and therefore the two calculations of PR and YME, while different, will nonetheless track each other. If, however, the borehole intersects discontinuities and or more the media is anisotropic, the computations of PR and/or YME will no longer track each other. The stress-strain relationships may be recast into other equivalent forms, and the particular arrangement shown in FIGS. 8, 9, and 10 are taken for the sake of conveniences and should not be considered limiting. In a particularly useful manner as shown in FIG. 11, the constitutive equations could be re-arranged so that the Young's modulus term is determined using the slope of a linear relationship if the equations were cast in terms of the ratio of the forces acting parallel to the axis of symmetry to the forces acting perpendicular to the axis of material symmetry.

In certain instances, such as drilling under high confining annular pressure, the confining pressure may be more accurately described using the annular pressure instead of WOB. In such a case, AP would be used in place of WOB for the cases illustrated in FIGS. 9A and 9B, and possibly others.

Some of the stress strain relationships are set out in terms of bi-axial loading accounting for weight on bit and torque on bit. However, it should be understood that an implementation accounting for tri-axial loading may nonetheless use and account for WOB and TOB or the RMS acceleration.

Thus, in the application of the stress-strain relationships for a layered media, where the bedding planes are horizontal a vertical well and a horizontal well are drilled through the same rock formation where:
1. Separate stress-strain relationships that describe the elastic coefficients when the bit is cutting perpendicular to the geological boundaries such as the bedding planes and when the bit is cutting parallel to the geological boundaries would enable at least four elastic coefficients to be determined which can be used to describe in general, stress-strain relationships of transverse isotropic rock formations.
2. Separate stress-strain relationships that describe the elastic coefficients when the bit is cutting parallel to the direction of maximum horizontal compressive stress and parallel to the maximum vertical compressive stress would enable at least four elastic coefficients to be determined.

Figure 10A:
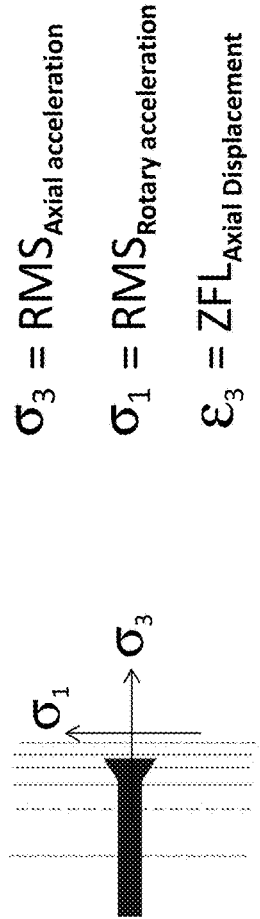
Figure 10B:
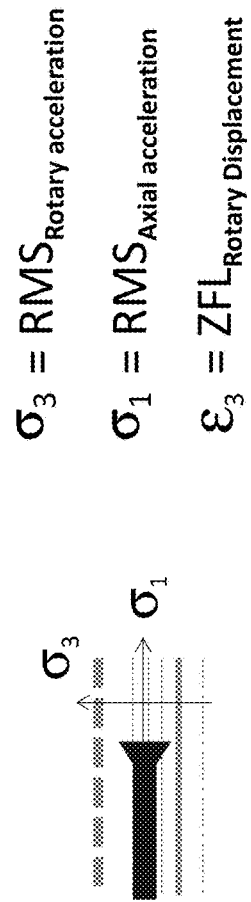

Referring to FIG. 10C, under the two assumptions (TI axis parallel to borehole and TI axis perpendicular to borehole (FIGS. 9A, 10A and 9B, 10B)), there are two values for PR and two values for YME, with PR and YME being elastic coefficients.

In practical application, the rock formation may not be actually horizontal or vertical, but may be tilted. When drilling through titled media, particularly media with small deviated angles of less than 30 degrees, given the expression of the trigonometric variables in relation to a rotation of the principle axis, the equations still produce useful results for PR and YME and may be used to inform the variation in the mechanical rock properties and in particular inform the location of fractures where the variation of the mechanical rock properties is predicted to do so as is described below.

Figure 12:
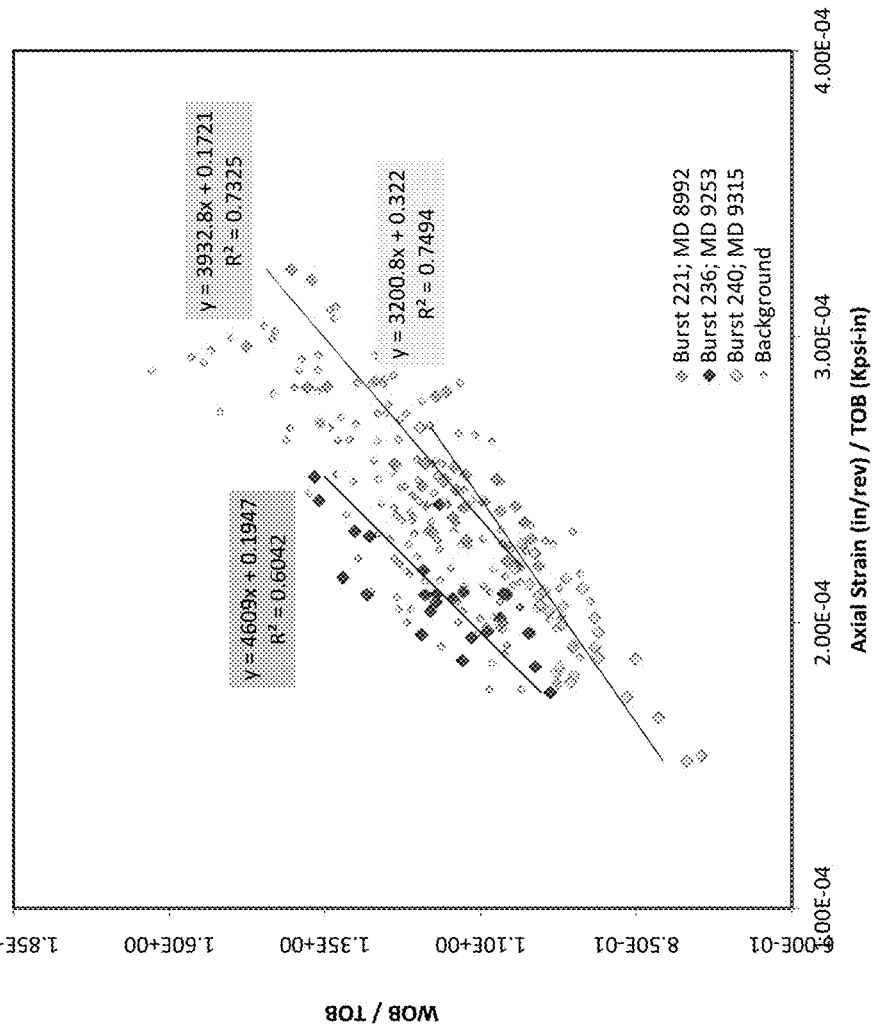
FIG. 12 illustrates stress strain curves obtained by the methods discussed herein.

On the Calculation of the Elastic Coefficients YME Aned PR Thorugh a Mechanical Rock Property Analysis (MRPA) of the Method FIG. 12 is a diagram illustrating linear stress strain relationships with curves fit to data pairs corresponding to different locations along a bore hole. The slopes of the fit lines in these examples relate to YME in different locations along a bore hole. To obtain data for populating the constitutive equation (or equations), various geophysical data processing techniques are involved, where:
1. Sampling the MWD measurements at a sufficiently high frequency to resolve a small degree of mechanical variability (which may correspond to the nature and occurrence of a discrete fracture a couple of mm wide), the measurements of the forces acting on a rock formation in connection with a drilling bit, (TOB and WOB) and fluid system pressure or annular pressure (Ap), the angular speed of the bit expressed in revolutions per unit of time (RPM) and the 3-components of motion that represent the acceleration of the bit and where each of the measurements taken in time corresponds to a discrete position of the bit along the length wellbore (the MWD data)
2. Processing accelerations may be processed using geophysical signal processing techniques to obtain (i) the average lateral or rotary and vertical displacement of the bit that correspond to a single revolution or turn of the bit and (ii) Root Mean Squared (RMS) amplitude of the acceleration
3. Calculating the RMS averages of the TOB and WOB over time windows that correspond to a single bit turn. Typical penetration rates are usually 0.02 in/rev, while drilling at 240 rpm, would result in a single turn of the bit every 250 ms which if sampled at 1 kHz would provide sufficient data to be able to identify when the bit encounters a single-discrete fracture
4. Obtaining data pairs, which collectively define the linear stress strain relationship, from MWD data using relationships between the rms acceleration and displacement of the bit that are appropriate for the loading conditions and motion of the bit in relation to the axis of symmetry for the constitutive equations used to describe the rock formation where it is understood that the loading conditions are determined with respect to the orientation of the drilling well.
5. Using curve fitting techniques to estimate the two parameters needed to describe a line, the Slope and Intercept and statistical descriptions of the variations of the two elastic parameters YME and PR with respect to each of the linear clusters as were identified with respect to the band-limited MWD data that was used to generate the data pairs
6. Identifying where the distributions of the MWD data pairs form spatially or temporally consistent clusters or otherwise a locus of adjacent points that (i) can be described through the application and use of curve fitting techniques in terms of relationships that are linear and (ii) such that each of the linear relationships can be used to determine the parameters of line such as the slope and intercept in relation to the mechanical rock properties YME and PR.

In one possible example, a set of data pairs are generated for the equation of FIGS. 9A (10A) and/or the FIG. 9B (10B). The data pairs are generated along the length of a well bore. In one example, a data pair comprises (y, x) and the set of data pairs may be used to generate the linear stress strain relationships illustrated in graphical form in FIG. 12 for each of the cases shown in FIGS. 9A and 9B.

In one embodiment, the variables of the equations are populated using (i) the RMS acceleration data, which is used to describe the forces acting on the formation in connection with the bit, and (ii) the ZFL of the displacement spectrum is used to describe the motion on the bit where the motion understood to be the strain experienced by the rock formation and where the orientations of strain are described by the bit displacements according to the cutting direction of the bit and the orientation of the borehole in relation to the orientation of the axis of material symmetry as is shown in Figure. Thus, the acoustical acceleration measurements may use to specify the forces acting on the formation. The approach essentially conforms with Newton's second law and balance of forces.

Special Cases to Consider

As shown, the MWD parameters may be expressed as a function of the frequency content. In particular, where the frequency content is limited through the application and use of a band-pass filter to generate band-limited MWD data pairs to populate the terms and conditions of the constitutive equations of linear elasticity, using band-limited MWD data to form frequency-dependent, data pairs corresponding to data that generally describes the stresses acting on the material and the deformation of the material to populate the terms and conditions of the constitutive equations of linear elasticity. Using geophysical signal processing techniques to obtain zero-frequency levels (ZFL) of the displacement spectra where the ZFL corresponds of depth of cut per revolution of the bit or the depth of cut per unit of time or the rate of penetration (ROP) in relation to the width of the bandpass filter used to window the MWD data (the band-limited MWD data). That is the ZFL is determined from a specified range of frequencies or is otherwise calculated from bandlimited data.

Using the two parameters YME and PR and the statistical descriptions of the variations of the two parameters as can be obtained through the curve fitting technique for each liner cluster to diagnose the drilling conditions for each of the depths as a function of the frequency used to form the data pairs.

Fracture Identification from the Elastic Coefficients

It is usually not known a priori what the appropriate angular relationships between the axis of symmetry of the constitutive elastic equations used to describe the rock formation and the axis of symmetry of the wellbore are. In practice, most horizontal wells are drilled parallel to bedding and most vertical wells are drilled perpendicular to bedding. Further, in basins, most natural fractures are vertical, and thus most horizontal wells are drilled perpendicular to fractures and most vertical wells drill parallel to fractures.

Referring again to FIGS. 9A and 9B, the MRPA technique is used to populate the terms and conditions of the two assumptive cases where the axis of symmetry of the constitutive media used to describe the rock formation are examined for the cases when (i) the axis of material symmetry is perpendicular to the axis of drilling and (FIG. 9A) (ii) the axis of material symmetry is parallel to the axis of drilling (FIG. 9B). In an isotropic media, the determination of YME and PR from the MRPA analysis for the two constitutive stress strain relationships will result in equally or closely spaced values of YME and PR that tend to track each other in space and time. In anisotropic media, the two computations of YME and PR as provided by the MRPA will deviate in predictable ways that can be used to identify the nature and occurrence fractures in relation to (i) the differences in the elastic coefficients as specified by the type of anisotropy, either HTI or TVI, that is encountered relative to the orientation of the drilling well and (ii) the reduction in strength of the rock as is provided by variations in HTI YME and the TVI YME.

In the case of a horizontal well when the constitutive equations describe a variation in the end members situations (i) the rock may be understood to be fractured when PR TVI is lower than PR HTI and the magnitude of the fracturing is related to the decrease in the calculation of YME. Typically, in practice, fractured zones can be discerned in horizontal wells when the media is TVI PR is lower than the HTI PR. The difference in the values of the elastic coefficients YME and PR between the HTI and VTI represent two cases of a cross-over curve or an anisotropic cross-over curve.

Figure 13:
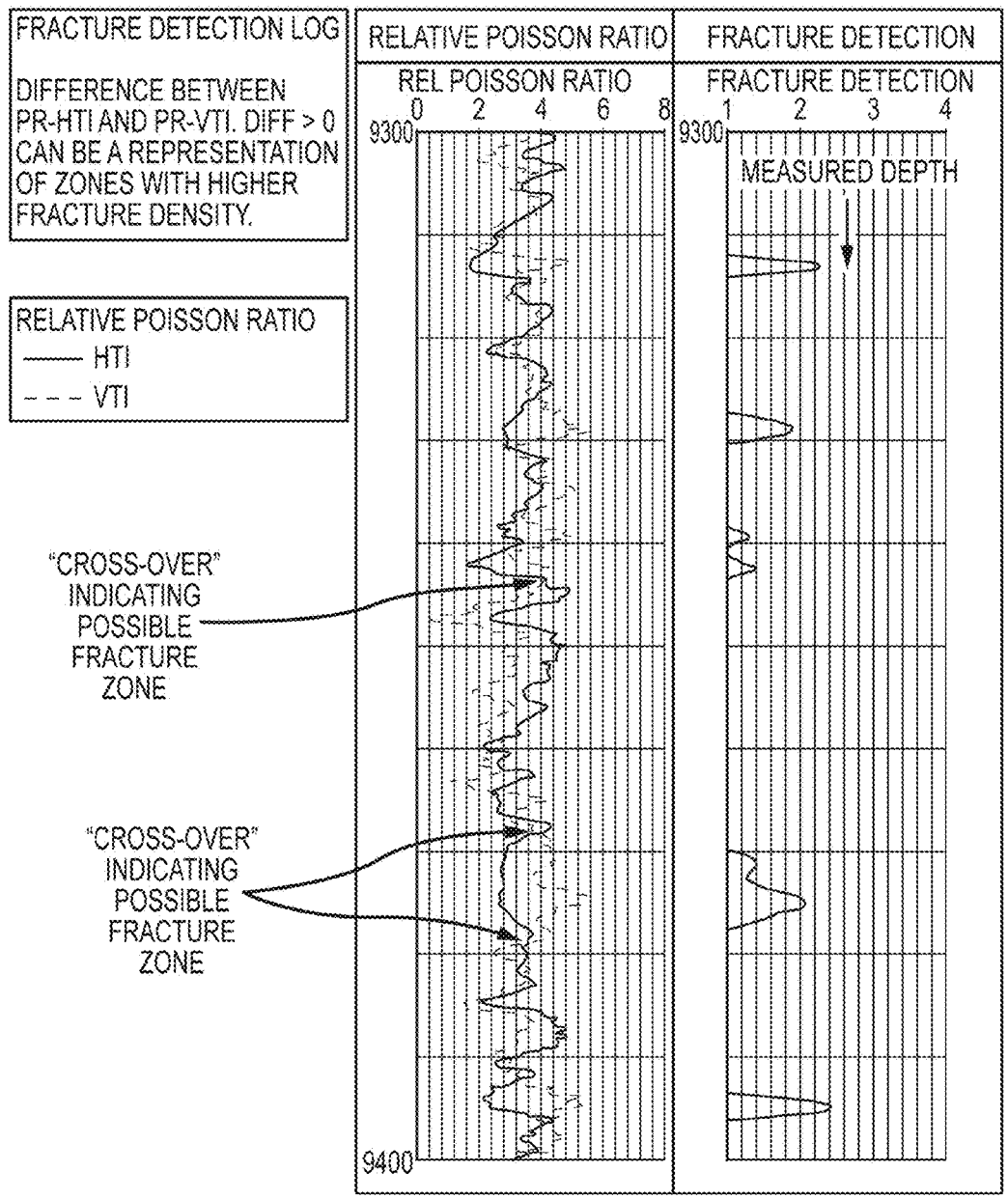
FIG. 13 illustrates two relative curves of Poisson's ration for a vertical well, with cross over points identifying likely preexisting fractures in the fracture detection log.

In the case of a vertical well, the rock is understood to be fractured when HTI PR is less than TVI PR (e.g., FIG. 13, discussed in more detail below). An objective way to determine these cross-over relationships (PR or YME for the two assumptive cases) is by calculating a series in time or a series in depth (the logs) of the YME or the PR for both the TVI and HTI solutions. Time or depth may be correlated to length along the well bore from which the measurements were made.

Mechanical rock property logs (the "Logs") as calculated using the equations set out by the method can be smoothed by averaging the PR and YME values by (i) using the statistics in relation to the goodness of fit to the curve where one such statistic is known as the R statistic as provided by standard least-squares linear curve fitters such as LINEST in Excel, to filter out data with poor statistical evidence for a linear relationship between the data pairs or (ii) to weight the values of the curve at a particular location. Using a curve smoothing technique that would average the data over a time window where the length of the time window corresponded to the variation of the data and then resampling the time window in either time or depth according to its position in the subsurface. Processing logs using smoothing techniques can improve the ability to identify the relative variations in the elastic coefficients.

Further processing the logs by subtracting the mean value from the HTI and TVI YME Logs where the mean value is a running average of the data along the Log where the length of the running average is related to:

(1) the measure of the smallest length of mechanical anisotropy variation of interest which in terms of the practice and application of the method may involve spatial distances as as small as 1 inch for the sample rate and frequency content that is afforded by the application of use of state-of-the-art MWD in relation to the method AND (2) of sufficient resolution to document the nature and occurrence of changes in rock properties needed to identify fractures at the resolution need for the commercial exploitation of commercial hydrocarbons from unconventional reservoirs.

The subtraction of the mean value of from the HTI and TVI PR Logs provides a baseline from which to compare the variations between the curves in ways that can be used to identify the locations of fractures. In practice the mean values of the Logs can be calculated as the average of the data values in the logs over a certain time or distance specified by the spatial position in the subsurface along the length of the wellbore from which the measurements were made. When this mean value is subtracted from the Logs it provides the mean-subtracted Logs from which to make it convenient to obtain relative comparisons (e.g., PR HTI to PR VTI and/or YME VTI to YME HTI).

Taking differences of the mean-subtracted YME HTI Log and the mean-subtracted YME TVI Log and taking the differences of the mean-subtracted PR HTI log and the mean-subtracted PR TVI log provides an identification of the type of rock anisotropy based on the orientation of the well in relation to the axis of material symmetry. The differences in these Logs as evidenced by the behavior of the elastic coefficients in relation to the orientation of media symmetry with respect to the orientation of the wellbore can be can be understood in predictable ways to describe the the location of a zone of weakness in relation to the method understood to be a fracture. For the cases presented here, these relationships provide a predictable way to identify fractured rock formations, among other advantages Specific Case 1: Vertical Well, Horizontal TI Media In typical TVI media, the vertical PR (FIG. 9A—TI axis parallel to borehole) typically has lower values than horizontal PR (FIG. 9B TI axis perpendicular to borehole). That is, the material is more compliant to a load that is applied perpendicular to the axis of material symmetry than to a load applied parallel to the axis of material symmetry. Loading the rock formation in the same direction as the axis of material symmetry will result in less horizontal deformation, decreased horizontal compliance and/or higher ratios of horizontal to vertical stiffness. Conversely, loading the rock formation perpendicular to the axis of material symmetry, when the material symmetry is governed by fractures, will have higher compliances, higher PR and lower YME.

Stated differently, in a vertical well when the media is layercake (the axis of media symmetry is parallel the borehole), the weight on bit and axial displacements are typically parallel to the axis of material symmetry. In this case the VTI PR is typically less than HTI PR. Therefore, detection of zones where PR VTI is greater than PR HTI implies that the material behavior under the loading conditions of the bit is stiffer or less compliant in the horizontal direction as opposed to the vertical direction. Referring to FIG. 13, when a vertical well encounters HTI media (in a formation expected to be VTI), the mean-subtracted PR HTI log becomes less than the mean-subtracted PR TVI log, and a Fracture ID flag may be generated. This flag means the ratio of the displacement parallel to the axis of material symmetry increases relative to the displacement perpendicular to the axis of material symmetry. This is evidenced through the application and use of MWD data to describe the constitutive behavior of a rock formation and demonstrate an increase in PR TVI relative to PR HTI. This increase in PR evidences the presence of vertical fractures or a vertically fractured rock formation when drilling a vertical well. This logic is generally true is most circumstances, because most vertical wells are drilled perpendicular to the bedding planes of the rock formation where the well bore axis is parallel to the axis of material symmetry and so the presence of high VTI PR values is probably not related to vertical bedding planes. This behavior of a vertically drilling well encountering a set of vertical fractures can be further corroborated by a similar examination of the differences between the VTI YME and the HTI YME. Because the torque on bit is acting as a body force parallel to the axis of material symmetry as would be expected in the case of a vertically drilling well encountering a set of vertical fractures where the fractures control the axis of material symmetry, the VTI YME decreases and the HTI YME increases.

When the YME TVI log crosses or decreases relative the YME/HTI log for a horizontal well then it is likely a zone of weakness that is more compliant in the direction of loading that is parallel to the WOB or perpendicular to the axis of material symmetry has been detected which would again be consistent with a zone of vertical fractures. So, in some instances, PR crossover would generate a flag, YME crossover would generate a flag, and in some instances the presence of both flags indicate a fracture. Moreover, in practice, a threshold may be applied that would need to be met before generating a flag. In one example, for PR data, a distribution curve may be generated for all positive crossovers, and only crossovers exceeding 68th or 90th or 95th percentile may be flagged. Other thresholds or data technique may also be used to eliminate data points that may be attributable to noise.

When the relationship between the HTI and TVI elastic constants returns to a pre-crossover relationship for a vertical well in an HTVI media, the crossover Fracture ID flag is set back to zero. The flag may remain set, however, for as long as the log indicates. So, as shown in the example of FIG. 13, there are six sections of the 100 foot illustrated borehole where fractures are identified over several feet for each section.

Specific Case 2: Horizontal Well, Horizontal TI Media

Figure 14A:
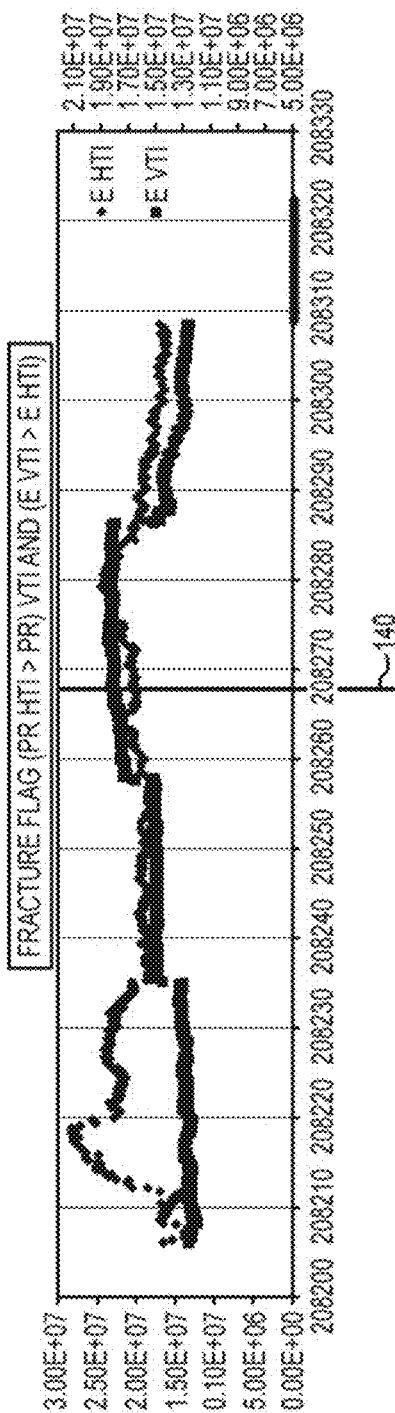
FIG. 14A illustrates two relative curves of Young's Modulus of Elasticity for a horizontal well.
Figure 14B:
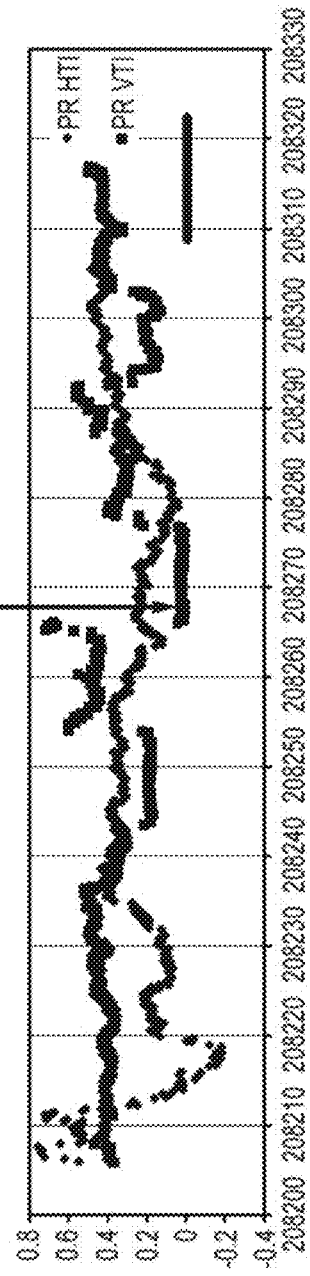
FIG. 14B illustrates two relative curves of Poisson's ration for the same horizontal well, with cross over points identifying mechanical rock properties indicative of preexisting fractures.

FIG. 14A illustrates the two YME computations over about 100 feet of horizontal well. FIG. 14B illustrates PR ratio computations over the same 100 fee of horizontal well. The YME and PR computations are based on data obtained while drilling. In this case, only the geophysical processing of the acoustical data as obtained from the accelerometers are used to populate the equations, so not direct measurements of WOB or TOB are provide in this example, but they could be included in another application and use of the equations as provided by the method. In the example illustrated in FIGS. 14A and 14B, a fracture ID may be generated where shown. In this case, effectively the opposite behavior than was described for a vertical well drilling parallel to the axis of symmetry or HTVI or layercake, is expected because now, in the case of a horizontal well in TI media, the axis of drilling is perpendicular to the axis of media symmetry. In this case, the loading conditions (torque on bit) are parallel to the axis of material symmetry conditions and rotational displacements (revolutions of the bit) are also parallel to the axis of material symmetry and HTI calculation will result in a lower HTI PR.

In the case of a horizontal well encountering a vertical fracture, the relationship is expected to be similar to a vertical well drilling in a HTVI media—the PR HTI will decrease relative to the mean-subtracted PR VTI. More specifically, in the event with the mean-subtracted VTI PR for a horizontal well drilling in a layercake media is found to be less than the mean-subtracted HTI PR, then it is likely that the axis of material symmetry relative to the orientation of the drilling well and loading conditions of the bit has been rotated by 90 degrees. This can occur when the axis material symmetry is defined by a set of vertical fractures being intersected by a horizontal well. Thus, as shown, for example in FIGS. 14A and 14B, a fracture flag may be identified in the identified areas, as well as possibly other areas.

Likewise, the mean subtracted TVI YME will increase relative to the mean-subtracted HTI YME when the material symmetry is as defined by a set of vertical fractures because torque on bit will be loading perpendicular to the axis of material symmetry. In this example the cross-overs are not always synonymous as can be expected for real rock where a continuum of mechanical rock properties will occur based on the natural heterogeneity of a complex, natural system where it is understood that the detection of fractures from among various the relationships between these cross-overs is just one implementation among others.

Among the advantages of the method is to use the values of the differences in the elastic coefficients between the various types of cross-over than can be expected from the method where in simple cases fracture flags identified by the simultaneous cross of bothe YME and PR curves as is afforded by the method, to other cases of mechanical rock heterogeneity that is caused by the occurrence of only one curve crossing over the other or vice versa. Here this may lead to additional fracture classification schemes that would involve the cross-over of one set of coefficients relative to the other.

Elastic coefficients and the variation in the elastic coefficients where the variation of the elastic coefficients is determined in one particular application though the differences as obtained by a subtraction and of the elastic coefficients for the HTI and VTI instances as is specified by the orientation of the well in relation to the axis of material symmetry. When the variations determined from the stress-strain relationships based on the geographical orientation of the well relative to the bedding planes provide an indication of fractures in accordance with the manner described here would provide useful information for the design the emplacement of hydraulic fractures treatments and the selection of hydraulic fracture initiation points.

Other Improvements as are Envisioned by the Method

In one embodiment, the wellbore is drilled laterally through an unconventional shale reservoir. The natural variations in the strength of an unconventional shale reservoir could be viewed by plotting a plethora of stress-strain relationships that could be derived in association with every single turn of the bit (FIG. 8). This would create a scatter plot that can be analyzed by using statistical methods to find significant relationships in the data that are used to classify the nature of the rock deformation based on the groupings of the mechanical rock property data on the stress-strain diagram.

These classified rock strength measurements may be indexed according to their spatial location along the well bore trajectory. Classification of the type of rock deformation such as strong or weak, brittle or ductile based on the mechanical rock properties and in particular the elastic coefficients in the stress-strain diagrams when logged using the MWD system could be used to identify and select zones along the wellbore selection of hydraulic fracture initiation points for the emplacement of hydraulic fractures.

Other stress-strain relationships can be developed in the manner described here where the forces acting the formation in connection with the bit are the effective stress obtained by differencing the force and the fluid pressures in the drilling system or the Torque acting on the bit. In another embodiment the orientation and geometry of the cutters in relation to the WOB and Torque can be used to describe tractions that are normal and tangential to the cutting face and be used to specify additional coefficients of elasticity as provided by the method. The normal traction can be modified by the drilling fluid pressures to calculate effective normal stress acting on the cutting face of the rock formation. When the effective normal stress and shear stress can be projected onto a fault place where the fault plane undergoes reactivation as evidenced by the methods here, when used in conjunction with a failure criterion, can provide critical information on the state-of-stress in the reservoir.

Inclination Measurements as Provided by the ZFL Measurements

Referring again to FIG. 6, it is understood that changes in the inclination of the bit, detectible with MWD data in combinations of the various forms discussed herein, may also identify discontinuities along a bore hole. More specifically, as illustrated, if the drill bit encounters a mechanical discontinuity or geological boundary, the cutting face of the drill bit may change its orientation is response to the orientation and stresses acting on the heterogeneity. Instantaneous changes in inclination of the drill bit relative to a long-term average inclination can be obtained using a sensor or an array of sensors (e.g. axial and lateral or rotary accelerometers) configured to record and extract signals in relation to the three, independent spatial axes of the drilling vibrations. The magnitude of the deflection of the inclination of the drill bit relative to a long-term trend in the direction of the drill bit depends on the orientation of the mechanical discontinuity or geological boundary with respect to the cutting face of the drill bit and therefore the deflection is understood to indicate a change in the mechanical rock properties. If there is an indication of a fracture based on the RMS levels of the other measurements, but no corresponding deflection in the bit, then it is understood that the orientation of the mechanical discontinuity is perpendicular to the orientation of the well bore trajectory. The magnitude of the deflection of the drill bit can be determined through a principle component analysis of the signals extracted from the drilling vibrations where the time window used to obtain principle components of drilling motion of the signals may be normalized by the bit speed and where the principle components can be expressed as changes in the rate of penetration (ROP) or the acceleration of the drill bit.

Discrete Microearthquake Detection Method to Identify a Fault

Figure 15:
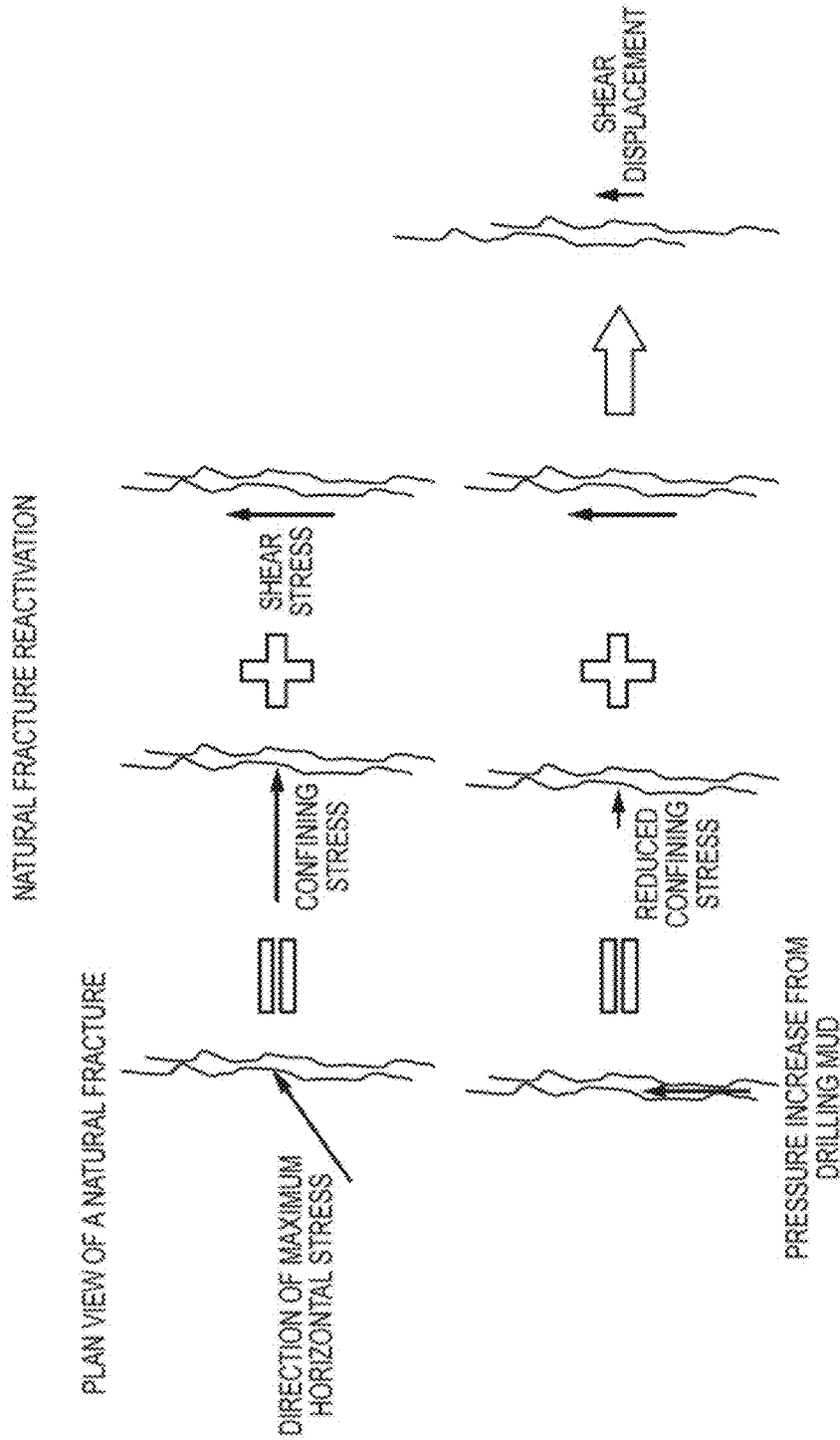
FIG. 15 If the forces acting on the formation in connection with the drill bit and drilling fluid system when conducting drilling operations are sufficient to overcome the failure criteria of a pre-existing fault, then the fault will slip or fail. Reactivation of a fault or pre-existing fracture can be evidenced by extracting a signal from the drilling vibrations that is related to a microseismic event with attendant primary, compressional (P) and secondary, or shear (S) arrivals. In the case where the fault is perpendicular to the trajectory of the wellbore the P-wave arrival is related the particle motion parallel to the axis of the drill string and the S- or transverse wave is the particle motion parallel to the lateral and torsional motion of the drill string. Deviations of the particle motion of the P- and S-waves relative to the orientation of the well can be used to determine the orientation of the fault.

Referring now to FIG. 15 if the forces acting on the formation in connection with the drill bit and drilling fluid system when conducting drilling operations are sufficient to overcome the failure criteria of a pre-existing fault, then the fault will slip or fail. Reactivation of a fault or pre-existing fracture can be evidenced by extracting a signal from the drilling vibrations that is related to a microseismic event with attendant primary, compressional (P) and secondary, or shear (S) arrivals. In the case where the fault is perpendicular to the trajectory of the wellbore the P-wave arrival is related the particle motion parallel to the axis of the drill string and the S- or transverse wave is the particle motion parallel to the lateral and torsion motion of the drill string. Deviations of the particle motion of the P- and S-waves can be used to determine the orientation of the fault relative to the trajectory of the wellbore.

Reactivation of a fault is expected to create much larger signals are typically expected from the acoustic emissions generated by the fracturing of a rock formation in relation to the cutting action of the bit. By looking at the instantaneous amplitude levels relative to a long-term trend, where the temporal windows used to select the instantaneous amplitudes are related to the bit speed and the long-term window is related to the spatial distribution of the faults in the rock formation, it is possible to identify the location where the bit encountered and crossed a fault.

In the special case of a fault reactivation while conducting drilling operations, the sensors deployed on the bottomhole assembly act like an earthquake seismometer where the geophysical signal processing techniques identify the discrete arrivals of P-waves and S-waves with orthogonal particle motions to detect the presence and reactivation of a pre-existing fault. If the orientation of the fault with respect to the orientation and magnitude of the forces acting on the formation in connection with the bit and drilling fluid system can be determined then this would enable a method to specify in 3-dimensions a failure criterion of the fault.

Geosteering or Real-time Applications of the Method

Stick-slip drilling behavior causes the bit speed, typically expressed in revolutions, per minute to increase or decrease according to the distribution of forces acting on the formation in connection with the bit. The variations of the bit speed with respect to the forces used to fracture a rock formation to achieve optimum rates of penetration are typically used to describe the efficiency of the drilling operation, where there is an optimum efficiency that maximizes the rate of penetration with respect to the forces acting on the bit Techniques that can determine the deformation of a rock formation by describing formation fracturing while conducting drilling provide that when these techniques are enabled in real-time implementations using MWD systems and apparatus, they also can be used to "geosteer" the horizontal well at the bit by maintaining the trajectory of the wellbore in the hydrocarbon bearing zone that experiences fracturing generated by the cutting action of the bit in relation to the forces acting on the formation in connection with the bit and drilling system that has bearing on the mechanical rock properties that will enhance the effectiveness of hydraulic fracture emplacements.

Example embodiments described herein regarding the various control methods may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment.

Figure 16:
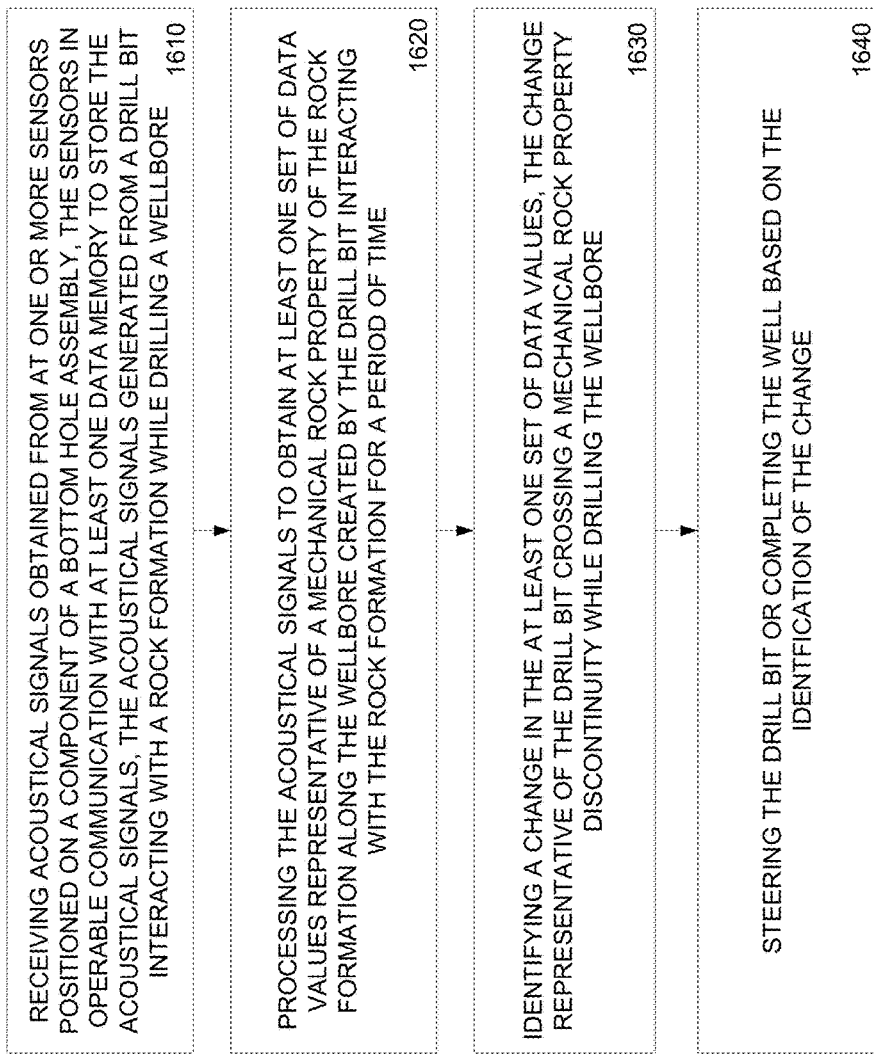
FIG. 16 is a flow diagram of a method of obtaining mechanical rock properties of a formation proximate a well bore from measurements of bit behavior taken while drilling.

FIG. 16 is a flowchart illustrating one method conforming with aspects of the present disclosure. It should be recognized that the elaborate detail and various alternatives and embodiments set out herein may constitute other methods, alone or in combination with that set forth in FIG. 16. Moreover, various steps of the method of FIG. 16, as well as other methods, may be performed within a computer system such as set out in FIG. 17 or may be performed, in whole or in part, in a bottom hole assembly associated with or proximate a bit, such as shown in FIG. 2, may form or be used in steering and may therefore be deployed in the geosteering system illustrated in FIG. 2 or may be deployed in various mechanisms associated with completions. Referring to FIG. 16, the method involves receiving acoustical signals obtained from one or more sensors positioned on a component of a bottom-hole assembly (operation 1610). The sensors (e.g., accelerometers) are in operable communication with at least one data memory to store the acoustical signals (e.g., vibration data) where the acoustical signals are generated from a drill bit interacting with a rock formation while drilling a wellbore. The method further involves processing the acoustical signals to obtain at least one set of data values representative of a mechanical rock property of the rock formation along the wellbore created by the drill bit interacting with the rock formation for a period of time (operation 1620). After which, the method may involve identifying a change in the at least one set of data values, where the change is representative of the drill bit crossing a mechanical rock property discontinuity while drilling the wellbore (operation 1630). In some instances, the method may further involve using the data to complete the well (operation 1640).

As will be appreciated from the devices, systems and methods provided and disclosed herein, aspects of the present disclosure may also involve the determination of absolute values of mechanical rock properties. The systems and techniques involve the application and use of (i) the forces or accelerations of the drill bit and (ii) the displacements or motions of the drill bit. Such force or acceleration and displacement data may be obtained from recording the near-bit mechanical drilling vibrations in relation to the drill bit interacting with a material having known properties and with a rock formation. In one specific example, drilling vibrations experienced by the drill bit from its breaking of rock while drilling, propagate as acoustical signals that are translated into data by accelerometers or other sensors positioned proximate the drill bit. The acoustical signals are translated into mechanical rock properties according to the techniques discussed herein. Further, by first drilling through some known media with known mechanical rock properties, such as a cement 38 (see FIG. 2B) in the well, the system may capture the vibration data and generate scalars. In turn, the scalars can be used to transform derived mechanical rock properties, from data captured in the same manner but for an unknown media, such as a formation being drilled through, into mechanical rock properties for that formation. In one example, the mechanical rock properties for the formation are considered absolute values in that the mechanical rock properties have been normalized by first obtaining scalars for the mechanical rock property computation, which may be based on using the same drill bit and related components to drill through a media with known properties.

Stated differently, the present disclosure outlines an innovative technique, and associated systems and apparatus, to obtain at least one set of calibration values, which in one specific case are scalars, in relation to drilling a rock formation or material with known mechanical properties. Scalars obtained in the manner presented here provide for a way to transform MWD data to stress and strain experienced by a rock formation or material when interacting with a drill bit.

An MWD device, as disclosed, measures and obtains data pertaining to drilling forces, such as the weight acting on the bit or the torque acting on the bit (i.e., WOB and TOB) and/or accelerations that describe the angular and linear motions of the bit. Mechanical rock properties may be described using stiffness coefficients, colloquially known as the $C_{ij}$'s, that are expressed in terms of stress represented generally as force per area and more specifically as pounds per square inch.

Stiffness coefficients of rock formations are expressed in terms of force per unit area and are on the order $1e10$ Pascal's or several Mpsi. Downhole measurements of forces such as weight on bit are on the order of 10's of kilopounds and torque on bit on the order of a few kilopounds per foot. Typical values of near-bit accelerations used to represent the forces acting on the formation can be on the order of several g's. And, typical values of the displacement of the bit as determined from processing the near-bit accelerations are on the order of several micrometers.

Because the MWD data represent forces or accelerations, and displacements as opposed to stress ($\sigma$) and strain ($\varepsilon$), respectively, corrections that take into account the physics of the elastic radiation of the vibrations generated by the drill bit, the transmission of vibrations as acoustical waves to the MWD data recorder 36, and the lengths and areas over which the radiation and transmission occur need to be obtained to transform the MWD data to units that can be used to obtain the stiffness coefficients or the material or rock formation being drilled. Likewise, the forces obtained from MWD data, such as weight on bit and torque on bit can be transformed to stresses with the understanding that a geometric correction factor in relation to the effective contact area is also involved. One example of such a contact area is the area of the bit.

In practical terms, it may be difficult or impossible to know, in-situ, the actual and precise contact area for any given turn of the bit. The area of the bit in contact with the rock formation depends on the various configurations of the cutters on the bit with respect to the weight on the bit and the wear of the cutters on the bit. More weight on the bit presses the cutters further into the formation and results in an increase in contact area as a function of the weight on bit and in a complex fashion. Also, the loss and wear of cutters during normal drilling operations will also have unpredictable and hard to determine changes in the contact area of the bit.

The motion of the bit also needs to be transformed or otherwise scaled to a strain in order to process the data using a stress-strain relationship and to obtain absolute values for the mechanical rock properties. The displacement of the bit that occurs relative to a given segment or reference length of the rock formation may be used to obtain the strain experienced by the rock formation when interacting with a drill bit. One such example of the reference length of the rock could be the circumference of the borehole. Using the circumference of the bit used to obtain the reference length would have to account for changes with respect to the radius of the bit or possibly in an arbitrary manner depending on the geometry and configurations of the cutters on the bit.

The use of geometrical constructs and analytical expressions of wave generation and propagation to transform the MWD data to obtain stress and strain of a rock formation interacting with a drill bit is unsatisfactory because, (i) the reference lengths of the rock with respect to the displacement of the bit is generally unknown, (ii) the area of the bit is rugose and variable, and (iii) the radiation and scattering of energy from the bit rock interface and the transmission of the energy to the MWD recorder is difficult if not impossible to accurately predict in-situ and under changing drilling conditions.

Figure 17:
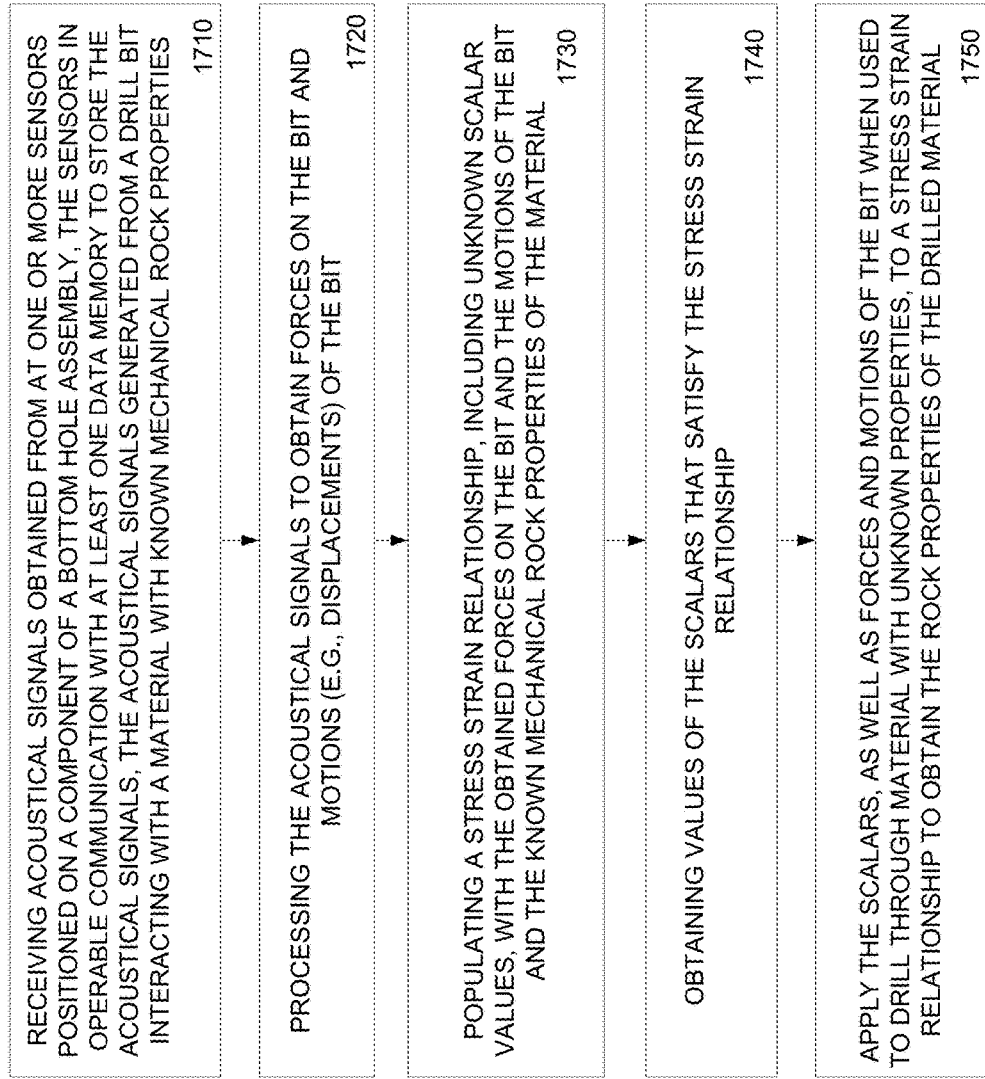
FIG. 17 is a flow diagram depicting a method of obtaining scalars according to one embodiment of the present disclosure.

Referring to FIG. 17, here we disclose an innovative method, which operations are performed by computing system, including a processor, to obtain a set of scalars from drilling a rock formation or material with known mechanical properties that transforms the accelerations or forces, and displacements obtained from MWD data to corresponding stresses and strains. The method involves (i) drilling through a material with known mechanical properties and obtaining signals, such as acoustical signals from the drill bit interacting with the material (operation 1710), (ii) processing the MWD data to obtain the forces on the bit and the motions of the bit interacting with the material (operation 1720), (iii) populating a general stress-strain relationship using (a) the forces on the bit, (b) the motions of the bit, (c) the values of the known mechanical rock properties and (d) the scalars (unknown) that are to be determined according to each force and displacement (operation 1730), and (iv) obtaining values of the scalars that satisfy conditions of the stress-strain relationship in relation to the knowledge of the mechanical rock properties (operation 1740). The acoustical signals may be stored in memory of the bit sub. These scalars are understood to account for geometrical considerations such as the effective areas and reference lengths in relation to the bit design and take into considerations other complex, hard-to-predict factors, such as the radiation and transmission of the drilling induced vibrations from the cutters to the MWD sensors.

The techniques discussed herein involve processing a material having known mechanical rock properties. Knowledge of the mechanical rock properties, which may be considered absolute values, useful to process drilling vibrations in relation to the method described can be obtained independently from common well known methods such as from (i) sonic or acoustical measurements of rock velocities that can be systematically related to mechanical rock properties or (ii) the application and use of techniques that systematically measure the deformation of a rock sample or a core from a rock sample in response to a given load or stress to obtain mechanical rock properties. Other knowledge about absolute values of mechanical rock properties that can be used to scale drilling vibrations may also be obtained from computer generated models of rock mineral stiffness coefficients. In some instances, the absolute values of mechanical rock needed to scale the drilling vibrations can be arrived at through deductive or experiential means or what is commonly understood as a best guess. Cement is one example of a material with known mechanical properties that is commonly encountered in a wellbore during the drilling process.

The process of drilling a horizontal well may be completed in a series of stages. The first stage may involve the drilling of a vertical well to a target formation 30, also referred to as a hydrocarbon bearing formation, which is part of a larger reservoir. After the first stage has been drilled, the wellbore is typically cased with steel tubes, which are held or suspended in place by cement between the outside of the steel and the wellbore. After setting the casing, there is typically cement 38, referred to as a cement plug, left in the bottom of the well. The second stage would then involve sidetracking to a lateral or drilling through the cement plug in order to begin drilling directionally forming a horizontal well 38 towards the reservoir in order to intersect and target hydrocarbon formations of the reservoir.

In the instance where the rock formation or material being drilled includes a cement plug with known mechanical rock properties per or given the constituents of the cement or other techniques that can be used to investigate the mechanical properties of a cement as described above, then the processing of the acoustical signals generated by drilling vibrations involves an innovative way to obtain stress and strain from corresponding forces or accelerations of the bit, and the motions or displacements of the bit in relation a set of scalars (A, B, C, D, E and F) with respect to or representative of the known mechanical rock properties.

The mechanical properties of the cement can be expressed as an isotropic media in terms of two elastic stiffness coefficients $C_{11}$ and $C_{12}$. The isotropic stiffness coefficients and the forces or accelerations and displacements of the bit in relation to the scalars (A, B, C, D, E, F) that are required to transform the MWD data to stress and strain can be arranged through a system of linear equations as follows:

$$\begin{bmatrix} -a_1 & 0 & 0 & d_1C_{11} & d_2C_{12} & d_3C_{12} \\ 0 & -a_2 & 0 & d_1C_{12} & d_2C_{11} & d_3C_{12} \\ 0 & 0 & -a_3 & d_1C_{12} & d_2C_{12} & d_3C_{11} \end{bmatrix} \begin{bmatrix} A \\ B \\ C \\ D \\ E \\ F \end{bmatrix} = \begin{bmatrix} 0 \\ 0 \\ 0 \end{bmatrix}$$

This stress-strain relationship represents a homogeneous system of linear equations that can be solved for the scalars (A, B, C, D, E and F) from measurements while drilling a cement or other isotropic material where the mechanical properties are known. Here the displacements or "d" terms and the accelerations or "a", terms are specified respectively in terms of (i) the axial, angular, centripetal and/or lateral displacement of the drill bit and (ii) the axial, angular, centripetal and/or lateral accelerations of the bit when interacting with the cement. Values for the stiffness coefficients, $C_{11}$ and $C_{12}$, are known for the sample media. In various possible examples, the "d" terms may be any combination of displacements (e.g., $d_1$ is axial, $d_2$ is angular, and $d_3$ is centripetal, or $d_1$ is angular, $d_2$ is centripetal and $d_3$ is axial, or $d_1$ and $d_2$ are axial and $d_3$ is angular, etc.), and the acceleration or the "a" terms may similarly be any combination of accelerations.

It would also be possible to represent the "a" terms using dynamic data, such as from strain gauges associated with the MWD, of the WOB and the TOB where the solution to the scalars would represent the effective contact areas of the bit with respect to the orientation of the forces being applied to the bit.

Stated independently, the effective contract areas of the bit acted on by the torque is not expected to be the same as the effective contact area acted on by the weight on bit. The differences in these contact areas depend on the geometry and configuration or arrangement of the cutters and the exposure of the cutters. In the case of scaling the weight and torque forces to stress, the scalars describe how the cutter exposure with respect to a particular bit design transform the forces to the stresses normal and perpendicular to the motion of the bit.

The method can also be extended to include the cases when the forces on the bit are obtained from surface drilling dynamics measurements, such as WOB and TOB, where the torque is obtained from surface measurements such as the rate of fluid flow through the motor.

The values of the scalars can also be obtained, in relation to other more exotic material symmetries as well such as transverse isotropy, orthotropy, triclinicity, etc.

Let it also be understood that any assumptions placed on the scalars such as B=C or A=1 or B=0 represent degenerative cases of the stated solution.

This system of equations can be modified to obtain scalars using other isotropic representations of the elastic coefficients, where the stress-strain relationship may be expressed using elastic coefficients such as Young's modulus of elasticity and Poisson's ratio and therefore the formulation as shown above in terms of the stiffness coefficients $C_{11}$ and $C_{12}$ should not be considered limiting.

Because the cement plugs can be of hundreds of feet in length, drilling this cement casing plug with respect to time may take several minutes or even hours to drill. Therefore, MWD data obtained from of a drill bit interacting with cement may result in multiple measurements of the forces or accelerations, and displacements allowing the population of these equations under different drilling conditions and thereby determining a single set of scalars that satisfy a solution to the homogeneous stress-strain equations.

The application and use of a single set of scalars to transform MWD data to stress and strain can be thought of like this: if the cement properties along the length of the lateral are constant and isotropic, and the drilling conditions vary, which they will, then the variations in the stress and strain experienced by the cement that are caused by the variations in the applied drilling behavior, are understood to fall along a locus of points that defines or otherwise describes the elastic portion of the stress-strain relationship as is given the isotropic stiffness coefficients of the cement or other isotropic material with known mechanical properties.

The homogeneous system of equations can be solved using algebraic techniques to construct the inverse of a matrix, e.g., by using a singular value decomposition (SVD). The SVD describes a family of solutions to the given system of equations in terms of linear combinations of the eigenvectors that correspond to the zero valued eigenvalues of the SVD decomposition. The set of scalars obtained from a solution to the homogeneous equations is given by a linear combination of the eigenvectors, (U, V and W) associated with the zero-valued eigen values as follows:

$$\rho_1 \begin{bmatrix} u_1 \\ u_2 \\ u_3 \\ u_4 \\ u_5 \\ u_6 \end{bmatrix} + \rho_2 \begin{bmatrix} v_1 \\ v_2 \\ v_3 \\ v_4 \\ v_5 \\ v_6 \end{bmatrix} + \rho_3 \begin{bmatrix} w_1 \\ w_2 \\ w_3 \\ w_4 \\ w_5 \\ w_6 \end{bmatrix} = \begin{bmatrix} A \\ B \\ C \\ D \\ E \\ F \end{bmatrix}$$

A solution for the scalars is obtained by $\rho_1=1$ and $\rho_2=\rho_3=0$.

While cement can be represented as an isotropic material, other measurements, like acoustical measurements or sonic measurements of rock velocity can be used to specify, a priori, the absolute values of the mechanical rock properties in terms of stiffness coefficients or other elastic coefficients for a transverse isotropic media or other more exotic media symmetries. In the case of a transverse isotropic media, the stress-strain equations in relation to the scalars are:

$$\begin{bmatrix} -a_1 & 0 & 0 & d_1C_{11} & d_2C_{12} & d_3C_{13} \\ 0 & -a_2 & 0 & d_1C_{12} & d_2C_{11} & d_3C_{13} \\ 0 & 0 & -a_3 & d_1C_{13} & d_2C_{13} & d_3C_{33} \end{bmatrix} \begin{bmatrix} A \\ B \\ C \\ D \\ E \\ F \end{bmatrix} = \begin{bmatrix} 0 \\ 0 \\ 0 \end{bmatrix}$$

This stress-strain relationship represents a homogeneous system of linear equations that can be solved for the scalars (A, B, C, D, E and F) from measurements while drilling cement. Here the displacements ("d" terms) and the accelerations ("a" terms) are specified respectively in terms of (i) the axial, angular, centripetal and/or lateral displacement of the drill bit and (ii) the axial, angular, centripetal and/or lateral accelerations of the bit when interacting with the cement. Unlike the isotropic case, for transverse isotropic media, it should be appreciated that the terms for the accelerations and displacements are arranged according to the orientation of the drilling well with respect to the axis of material symmetry. For example, laterally drilling a vertically transverse isotropic (VTI) media would place the axial acceleration and axial displacement with respect to the $a_1$ and $d_1$ terms.

It would also be possible to represent the "a" terms using MWD of the weight on bit and the torque on bit where the solution to the scalars would represent the effective contact area of the bit. Again, for laterally drilling a VTI media the weight on bit measurement would be used to inform the $a_1$ term and the scalar A, would be understood to reference the effective area of the cutter exposure acting in the direction of drilling. The scalars obtained in this manner describe how the geometry and configuration of the cutters convert the drilling forces to stresses.

The solutions to the scalars in this example would follow as for the isotropic example where a linear combination of the three eigenvectors associated with the zero eigenvalues obtained from a SVD of the coefficient matrix satisfies the homogenous equations and can be used to obtain the scalar values.

We have disclosed a method to obtain a set of scalars that when applied to the motions and accelerations or forces of a drill bit interacting with a rock formation or other material with known values of mechanical properties, and, in particular, a cement, can be used to transform MWD data to obtain stress and strain experienced by the material or rock formation.

In another rendition of the methods discussed herein, a computer model may be used to describe the stresses and strains of a material with known mechanical properties interacting with a drill bit. These stresses and strains can be obtained using a computer aided drafting of the arrangement and geometries of the cutters in contact with a computer description of an elastic material undergoing elastic deformation when subjected to computer generated forces and motions of the bit. The forces and motions of the bit can be converted to stress and strain with respect to the arrangement and geometry of the cutters on the bit. Accordingly, when actually drilling a material with unknown properties but with the same forces and displacements or stresses and strains as informed by the computer model, those stresses and strains can be used to scale the MWD data and in particular the accelerations and displacements directly to obtain the scalars according to:

$$A = \frac{a_1}{\sigma}, B = \frac{a_2}{\tau}, C = \frac{a_3}{\tau}$$
$$E = \frac{d_1}{\varepsilon_{axial}}, F = \frac{d_2}{\varepsilon_{radial}}, G = \frac{d_3}{\varepsilon_{angular}}$$

where:

the $\sigma$ and $t$ terms represent one of a stress acting perpendicular or parallel to the axis of drilling and the $\varepsilon$ terms represent the axial or one of the angular or linear strains perpendicular to the axis of drilling, and the "a" terms represent the acceleration of the bit with respect to the axis of drilling and the "d" terms represent the displacements of the bit with respect to the axis of drilling. Note, the motions and accelerations of the bit are scaled with respect to the corresponding stresses and strains obtained from the computer model of the bit interacting with the rock formation to obtain meaningful transformations of the MWD data to stress and strain.

Next, we further elaborate on the method through the application and use of the scalars to (i) not only transform the MWD data to stresses and strains but also, (ii) to obtain a general stress-strain relationship when drilling a rock formation with unknown mechanical rock properties (operation 1750). Using the scalars to transform the MWD data to stress and strain, the isotropic stress-strain relationship is described as follows:

$$\begin{bmatrix} Dd_1 & (Ed_2 + Fd_3) \\ Ed_2 & (Dd_1 + Fd_3) \\ Fd_3 & (Dd_1 + Ed_2) \end{bmatrix} \begin{bmatrix} C_{11} \\ C_{12} \end{bmatrix} = \begin{bmatrix} Aa_1 \\ Ba_2 \\ Ca_3 \end{bmatrix}$$

Figure 18:
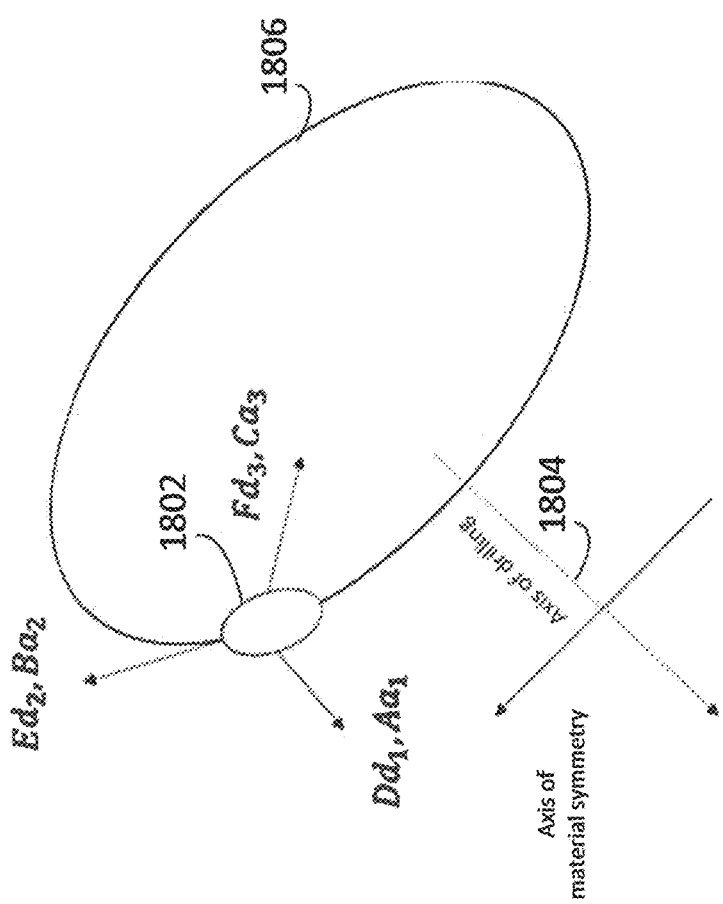
FIG. 18 is a diagram illustrating stress and strain relationships developed from acoustical signals captured by a three axis accelerometer positioned on a measurement while drilling assembly of a drill.

FIG. 18 is a diagram depicting the path of an accelerometer 1802 as a drill bit bores a hole along an axis of drilling 1804. The accelerometer may be positioned on or otherwise form a part of an MWD assembly. In any event, the accelerometer is positioned proximate a drill bit. The diagram is an isometric view of a path of the accelerometer as the drill bit rotates clockwise 1808. In this representation, the axial ($d_1$), lateral ($d_2$) and centripetal ($d_3$) displacements when multiplied by the respective scalars, D, E, F are the axial, lateral and centripetal strains, and likewise the axial ($a_1$), lateral ($a_2$) and centripetal ($a_3$) accelerations when multiplied by the respective scalars, A, B, C are the axial, lateral and centripetal stresses.

This system of equations can be solved using well known algebraic techniques to obtain a solution for the isotropic stiffness coefficients (e.g., $C_{11}$ and $C_{12}$). Because, the MWD data have been transformed to stress and strain through the application and use of the scalars, the isotropic stiffness coefficients obtain in this manner represent absolute values of the mechanical rock properties.

Note, the coefficients can be applied to obtain the absolute values of mechanical rock properties for other media symmetries such as transverse isotopic media with the media being horizontally transverse isotropic (HTI) or VTI as specified by the axis of material symmetry in relation to the orientation of the drilling well, such as follows:

$$\begin{bmatrix} Dd_1 & Ed_2 & Fd_3 & 0 \\ Ed_2 & Dd_1 & Fd_3 & 0 \\ 0 & 0 & (Dd_1 + Ed_2) & Fd_3 \end{bmatrix} \begin{bmatrix} C_{11} \\ C_{12} \\ C_{13} \\ C_{33} \end{bmatrix} = \begin{bmatrix} Aa_1 \\ Ba_2 \\ Ca_3 \end{bmatrix}$$

This method further advances the application and use of the absolute values of the elastic coefficients in predictable and systematic ways to inform the identification of fractures, bedding planes, material boundaries or other discontinuities that act to separate or other offset rock formations with different mechanical rock properties with respect to axis of media symmetry in relation to the orientation of the drilling well as follows.

Lateral Heterogeneity Along a Wellbore

The application and use of absolute values of the stiffness coefficients can be applied to in predictable ways to represent material or rock formation heterogeneity. In this instance, the presence of lateral heterogeneity encountered while drilling a well, and in particular where the lateral heterogeneity is generated through the nature and occurrence of fractures or a dilute system of flat aligned microcracks, then the identification of the lateral heterogeneity can be understood by comparing the absolute values of the isotropic stiffness coefficients to the stiffness coefficients that would understood to occur through the introduction of a set of parallel slip interfaces that are understood to simulate the presence of fractures or a fracture system as a set of closely spaced aligned joints. In the specific case, when the fractures are flat and have rotational symmetry, then the effect of introducing the fractures on an isotropic media may be specified through the introduction of two additional elastic parameters that effectively change the representation of the media, under the aforementioned assumptions to become transversely isotropic.

Under the methods presented here, where the scalars can be used to determine the stress-strain relationships and obtain absolute values of the stiffness coefficients for both an isotropic and a transversely isotropic media, advances previous techniques to identify the presence of fractures based on predictable differences of the stiffness coefficients between the isotropic and transversely isotropic media with respect to the orientation of a drilling well.

This is an improvement upon previous techniques where the differences between elastic coefficients obtained with respect to the orientation of the material symmetry in relation the axis of drilling were specified according to the relative changes of the elastic rock property curves.

Drill Bit Specification

The processing and analysis of drilling induced vibrations, under the methods disclosed here, can be used to describe how the arrangement and geometry of the cutters on a drill bit transform the forces or accelerations, and motions of the bit to the stresses and strains experienced by a rock formation or material. That is, the scalars can be used to specify the performance of a specific bit design in terms of the stresses and strains. The scalars therefore can be used to select or otherwise specify a bit design that is able to generate sufficient stresses necessary to cause the deformation and failure of a material or rock formation.

Because rock fragments according to the stresses experienced by a rock formation when interacting with a drill bit, using the scalars to obtain the stresses from MWD data can be used to improve the design of the bit with respect to the configuration and geometries of the cutters when interacting with a material or rock formation with known mechanical properties.

Under the scenario envisioned by the method, the processing and analysis of drilling induced vibrations to obtain stress and strain could be used to (i) select the configuration and geometries of the cutters that would materially improve the cutting efficiency of the bit, and (ii) predict the ability of the bit to drill through a material or rock formation or more specifically the rate of penetration with respect to the mechanical properties that are likely to be encountered. Selecting a bit design that maximized the rate of penetration with respect to the mechanical rock properties to be encountered when drilling a well is an important. There is a need to improve techniques to select the optimal bit design to maximize the drilling rate of penetration. Therefore, the scalars can be used with respect to the drilling forces to improve drilling performance and pre-drill drilling performance by selecting a drill bit based on the stress and strain that will be needed to drill a material or rock formation to the character of what is being drilled. For example, when the drilling program is expected to drill through a particularly hard or strong formation, then drilling performance may be enhanced by selecting a bit the generates more stress for a given rig capability (available power and drill string specifications) or augmentation through the introduction of a downhole motor in the BHA. This is useful for optimizing equipment selection, and in particular to select a downhole motor develop a field given the mechanical rock properties of the formations and reservoirs to be drilled.

Figure 19:
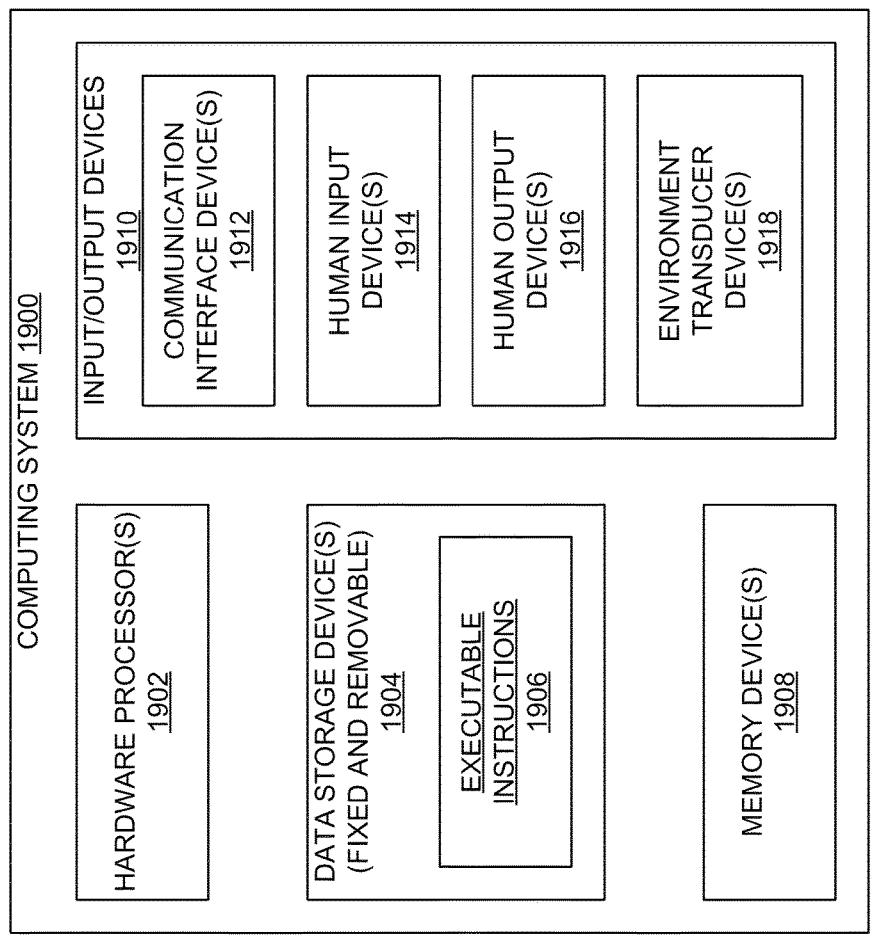
FIG. 19 is a special purpose computer programmed with instructions to execute methods discussed herein.

FIG. 19 below is a block diagram of a machine in the example form of a computer system 1900 within which instructions 1906 for causing the machine to perform any one or more of the methodologies, and various combinations of the same, discussed herein may be executed by one or more hardware processors 1902. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines or controllers that individually or jointly execute a set (or multiple sets) of instructions to perform any one or more of the methodologies discussed herein.

As depicted in FIG. 19, the example computing system 1900 may include one or more hardware processors 1902, one or more data storage devices 1904, one or more memory devices 1908, and/or one or more input/output devices 1910. Each of these components may include one or more integrated circuits (ICs) (including, but not limited to, field-programmable gate arrays (FPGAs), application-specific ICs (ASICs), and so on), as well as more discrete components, such as transistors, resistors, capacitors, inductors, transformers, and the like. Various ones of these components may communicate with one another by way of one or more communication buses, point-to-point communication paths, or other communication means not explicitly depicted in FIG. 19. Additionally, other devices or components, such as, for example, various peripheral controllers (e.g., an input/output controller, a memory controller, a data storage device controller, a graphics processing unit (GPU), and so on), a power supply, one or more ventilation fans, and an enclosure for encompassing the various components, may be included in the example computing system 200, but are not explicitly depicted in FIG. 19 or discussed further herein.

The at least one hardware processor 1902 may include, for example, a central processing unit (CPU), a microprocessor, a microcontroller, and/or a digital signal processor (DSP). Further, one or more hardware processors 1902 may include one or more execution cores capable of executing instructions and performing operations in parallel with each other. In some instances, the hardware processor is within the bit sub, and others it is part of another separate processing system.

The one or more data storage devices 1904 may include any non-volatile data storage device capable of storing the executable instructions 1906 and/or other data generated or employed within the example computing system 1900. In some examples, the one or more data storage devices 1904 may also include an operating system (OS) that manages the various components of the example computing system 1900 and through which application programs or other software may be executed. Thus, in some embodiments, the executable instructions 1906 may include instructions of both application programs and the operating system. Examples of the data storage devices 1904 may include, but are not limited to, magnetic disk drives, optical disk drives, solid state drives (SSDs), flash drives, and so on, and may include either or both removable data storage media (e.g., Compact Disc Read-Only Memory (CD-ROM), Digital Versatile Disc Read-Only Memory (DVD-ROM), magneto-optical disks, flash drives, and so on) and non-removable data storage media (e.g., internal magnetic hard disks, SSDs, and so on).

The one or more memory devices 1908 may include, in some examples, both volatile memory (such as, for example, dynamic random access memory (DRAM), static random access memory (SRAM), and so on), and non-volatile memory (e.g., read-only memory (ROM), flash memory, and the like). In one embodiment, a ROM may be utilized to store a basic input/output system (BIOS) to facilitate communication between an operating system and the various components of the example computing system 1900. In some examples, DRAM and/or other rewritable memory devices may be employed to store portions of the executable instructions 1906, as well as data accessed via the executable instructions 1906, at least on a temporary basis. In some examples, one or more of the memory devices 1908 may be located within the same integrated circuits as the one or more hardware processors 1902 to facilitate more rapid access to the executable instructions 206 and/or data stored therein.

The one or more data storage devices 1904 and/or the one or more memory devices 1908 may be referred to as one or more machine-readable media, which may include a single medium or multiple media that store the one or more executable instructions 1906 or data structures. The term "machine-readable medium" shall also be taken to include any tangible medium that is capable of storing, encoding, or carrying instructions 1906 for execution by the machine and that cause the machine to perform any one or more of the methodologies of the present invention, or that is capable of storing, encoding, or carrying data structures utilized by or associated with such instructions 1906.

The input/output devices 1910 may include one or more communication interface devices 1912, human input devices 1914, human output devices 1916, and environment transducer devices 1918. The one or more communication interface devices 1912 may be configured to transmit and/or receive information between the example computing system 1900 and other machines or devices by way of one or more wired or wireless communication networks or connections. The information may include data that is provided as input to, or generated as output from, the example computing device 1900, and/or may include at least a portion of the executable instructions 1906. Examples of such networks or connections may include, but are not limited to, Universal Serial Bus (USB), Ethernet, Wi-Fi®, Bluetooth®, Near Field Communication (NFC), and so on. One or more such communication interface devices 1910 may be utilized to communicate one or more other machines, either directly over a point-to-point communication path or over another communication means. Further, one or more wireless communication interface devices 1912, as well as one or more environment transducer devices 1918 described below, may employ an antenna for electromagnetic signal transmission and/or reception. In some examples, an antenna may be employed to receive Global Positioning System (GPS) data to facilitate determination of a location of the machine or another device.

In some embodiments, the one or more human input devices 1914 may convert a human-generated signal, such as, for example, human voice, physical movement, physical touch or pressure, and the like, into electrical signals as input data for the example computing system 1900. The human input devices 1914 may include, for example, a keyboard, a mouse, a joystick, a camera, a microphone, a touch-sensitive display screen ("touchscreen"), a positional sensor, an orientation sensor, a gravitational sensor, an inertial sensor, an accelerometer, and/or the like.

The human output devices may convert electrical signals into signals that may be sensed as output by a human, such as sound, light, and/or touch. The human output devices 1916 may include, for example, a display monitor or touchscreen, a speaker, a tactile and/or haptic output device, and/or so on.

The one or more environment transducer devices 1918 may include a device that converts one form of energy or signal into another, such as from an electrical signal generated within the example computing system 1900 to another type of signal, and/or vice-versa. Further, the transducers 1918 may be incorporated within the computing system 1900, as illustrated in FIG. 19, or may be coupled thereto in a wired or wireless manner. In some embodiments, one or more environment transducer devices 1918 may sense characteristics or aspects of an environment local to or remote from the example computing device 1900, such as, for example, light, sound, temperature, pressure, magnetic field, electric field, chemical properties, physical movement, orientation, acceleration, gravity, and so on. Further, in some embodiments, one or more environment transducer devices 1918 may generate signals to impose some effect on the environment either local to or remote from the example computing device 1900, such as, for example, physical movement of some object (e.g., a mechanical actuator), receiving or processing accelerometer data, strain gauge data, and the like.

What is claimed:

1. A method of characterizing rock properties comprising:
   processing, at a processor, a first set of acoustical signals obtained from one or more sensors, the first set of acoustical signals generated from a drill bit interacting with a rock formation while drilling a wellbore, to obtain forces acting on the drill bit interacting with the rock formation while drilling the wellbore and to obtain displacements of the drill bit interacting with the rock formation while drilling the wellbore;
   scaling, at the processor, the obtained forces acting on the drill bit interacting with the rock formation while drilling the wellbore and the obtained displacements of the drill bit interacting with the rock formation while drilling the wellbore to obtain information representative of stresses and strains of the rock formation; and
   processing, at the processor, the scaled forces and the scaled displacements to obtain at least one set of data values representative of a mechanical rock property of the rock formation along the wellbore created by the drill bit interacting with the rock formation for a period of time.

2. The method of claim 1 wherein scaling further comprises:
   applying scalars to the obtained forces acting on the drill bit interacting with the rock formation while drilling the wellbore and the obtained displacements of the drill bit interacting with the rock formation while drilling the wellbore, the scalars derived from acoustical signals generated from the drill bit acting on a sample with known mechanical rock properties.

3. The method of claim 2 further comprising:
   obtaining the scalars by:
   processing, at the processor, a second set of acoustical signals obtained from the one or more sensors wherein the one or more sensors are positioned on a component of a bottom hole assembly, the second set of acoustical signals generated from the drill bit interacting with the sample, the second set of acoustical signals processed to obtain forces acting on the drill bit interacting with the sample and to obtain displacements of the drill bit interacting with the sample;

processing, at the processor, the obtained forces acting on the drill bit interacting with the sample and the obtained displacements of the drill bit interacting with the sample to obtain the scalars that conform to a stress strain relationship of the sample with known mechanical rock properties.

4. The method of claim 3 wherein the stress strain relationship is:

$$\begin{bmatrix} -a_1 & 0 & 0 & d_1C_{11} & d_2C_{12} & d_3C_{12} \\ 0 & -a_2 & 0 & d_1C_{12} & d_2C_{11} & d_3C_{12} \\ 0 & 0 & -a_3 & d_1C_{12} & d_2C_{12} & d_3C_{11} \end{bmatrix} \begin{bmatrix} A \\ B \\ C \\ D \\ E \\ F \end{bmatrix} = \begin{bmatrix} 0 \\ 0 \\ 0 \end{bmatrix}$$

where:
the a values are forces or accelerations acting on the drill bit interacting with the sample;
the d values are displacements of the drill bit interacting with the sample;
where $C_{11}$ and $C_{12}$ are populated with known rock properties of the sample; and
A-F are the scalars being obtained.

5. The method of claim 4 where the stress strain relationship is:

$$\begin{bmatrix} -a_1 & 0 & 0 & d_1C_{11} & d_2C_{12} & d_3C_{13} \\ 0 & -a_2 & 0 & d_1C_{12} & d_2C_{11} & d_3C_{13} \\ 0 & 0 & -a_3 & d_1C_{13} & d_2C_{13} & d_3C_{33} \end{bmatrix} \begin{bmatrix} A \\ B \\ C \\ D \\ E \\ F \end{bmatrix} = \begin{bmatrix} 0 \\ 0 \\ 0 \end{bmatrix}$$

where:
the a values are forces or accelerations acting on the drill bit interacting with the sample with respect to an axis of material symmetry of the sample;
the d values are displacements the drill bit interacting with the sample with respect to the axis of material symmetry of the sample;
where the Cijs are populated with known rock properties of the sample; and
A-F are the at least one set of scalars being obtained.

6. The method of claim 4 wherein:
the first set of acoustical signals are captured at the one or more sensors as axial accelerations of the drill bit generated from the drill bit interacting with the rock formation while drilling the wellbore and a lateral or rotary acceleration of the drill bit generated from the drill bit interacting with the rock formation while drilling the wellbore; and
the second set of acoustical signals are captured at the one or more sensors as axial accelerations of the drill bit generated from the drill bit interacting with the sample and a lateral or rotary acceleration of the drill bit generated from the drill bit interacting with the sample.

7. The method of claim 6 wherein:
processing, at the processor, the obtained forces acting on the drill bit interacting with the sample and the obtained displacements of the drill bit interacting with the sample to obtain the scalars that conform to a stress strain relationship of the sample with known mechanical rock properties wherein the stress strain relationship is a first stress strain relationship of:

$$\begin{bmatrix} -a_1 & 0 & 0 & d_1C_{11} & d_2C_{12} & d_3C_{12} \\ 0 & -a_2 & 0 & d_1C_{12} & d_2C_{11} & d_3C_{12} \\ 0 & 0 & -a_3 & d_1C_{12} & d_2C_{12} & d_3C_{11} \end{bmatrix} \begin{bmatrix} A \\ B \\ C \\ D \\ E \\ F \end{bmatrix} = \begin{bmatrix} 0 \\ 0 \\ 0 \end{bmatrix}$$

where:
$d_1$, $d_2$, and $d_3$ are any one of axial, centripetal, or lateral displacement of the drill bit during the period of time,
$a_1$, $a_2$, $a_3$ may be any one of axial, centripetal or lateral acceleration of the drill bit during the period of time,
$C_{11}$ and $C_{12}$ are known values for the sample, and
A-F are the obtained at least one set of scalars further wherein:
scaling the obtained forces acting on the drill bit interacting with the rock formation while drilling the wellbore and the obtained displacements of the drill bit interacting with the rock formation while drilling the wellbore to obtain information representative of stresses and strains of the rock formation; and processing the scaled forces and the scaled displacements to obtain at least one set of data values representative of a mechanical rock property of the rock formation along the wellbore created by the drill bit interacting with the rock formation for a period of time comprises applying a second stress strain relationship of:

$$\begin{bmatrix} Dd_1 & (Ed_2 + Fd_3) \\ Ed_2 & (Dd_1 + Fd_3) \\ Fd_3 & (Dd_1 + Ed_2) \end{bmatrix} \begin{bmatrix} C_{11} \\ C_{12} \end{bmatrix} = \begin{bmatrix} Aa_1 \\ Ba_2 \\ Ca_3 \end{bmatrix}$$

where:
A-F are the obtained scalars of the first stress strain relationship,
$d_1$, $d_2$, and $d_3$ are any one of axial, centripetal, or lateral displacement of the drill bit as applied in the first stress strain relationship to the rock formation by the drill bit during the period of time,
$a_1$, $a_2$, $a_3$ are any one of axial, centripetal or lateral acceleration of the drill bit as applied in the first stress strain relationship to the rock formation by the drill bit during the period of time, and
$C_{11}$ and $C_{12}$ are the obtained at least one set of data values representative of the mechanical rock property of the rock formation along the wellbore.

8. The method of clam 4 wherein:
processing, at the processor, the first set of acoustical signals comprises obtaining a root mean square of the axial acceleration of the drill bit generated from the drill bit interacting with the rock formation while drilling the wellbore and a root mean square of at least one of the lateral and rotary acceleration of the drill bit generated from the drill bit interacting with the rock formation while drilling the wellbore, and obtaining an axial displacement of the drill bit generated from the drill bit interacting with the rock formation while drilling the wellbore and at least one of a lateral and rotary displacement of the drill bit generated from the drill bit interacting with the rock formation while drilling the wellbore; and processing, at the processor, the second set of acoustical signals comprises obtaining a root mean square of the axial acceleration of the drill bit generated from the drill bit interacting with the sample and a root mean square of at least one of a lateral and rotary acceleration of the drill bit generated from the drill bit interacting with the sample, and obtaining an axial displacement of the drill bit and at least one of a lateral and rotary displacement of the drill bit generated from the drill bit interacting with the sample.

9. The method of claim 2 wherein the sample is cement used to set a casing of the wellbore.

10. The method of claim 2 wherein the sample is a rock formation with known mechanical rock properties.

11. The method of claim 2 wherein the known mechanical rock properties of the sample are obtained from at least one of sonic measurements, core measurements, cutting measurements, seismic measurements, wireline log measurements, and a mineralogical model.

12. The method of claim 1 wherein the at least one set of data values include at least one absolute Cij value.

13. A method of calibrating mechanical rock property derivations from a drilling tool comprising:

obtaining, at a processor, a force data and a displacement data from signals obtained from one or more sensors positioned on a component of a drilling tool proximate a drill bit, the force data and the displacement data being of a drill bit interacting with a material with known mechanical rock properties;

processing, at the processor, the force data and the displacement data to obtain a set of scalars that conform to a stress strain relationship of the material with a known mechanical rock property.

14. The method of claim 13 wherein the stress strain relationship is:

$$\begin{bmatrix} -a_1 & 0 & 0 & d_1C_{11} & d_2C_{12} & d_3C_{12} \\ 0 & -a_2 & 0 & d_1C_{12} & d_2C_{11} & d_3C_{12} \\ 0 & 0 & -a_3 & d_1C_{12} & d_2C_{12} & d_3C_{11} \end{bmatrix} \begin{bmatrix} A \\ B \\ C \\ D \\ E \\ F \end{bmatrix} = \begin{bmatrix} 0 \\ 0 \\ 0 \end{bmatrix}$$

where:

the a values are the force data with respect to an axis of material symmetry of the material;

the d values are the displacement data with respect to the axis of material symmetry of the material;

where $C_{11}$ and $C_{12}$ are populated with the known mechanical rock property of the material; and A-F are the set of scalars.

15. The method of claim 13 wherein the stress strain relationship is:

$$\begin{bmatrix} -a_1 & 0 & 0 & d_1C_{11} & d_2C_{12} & d_3C_{13} \\ 0 & -a_2 & 0 & d_1C_{12} & d_2C_{11} & d_3C_{13} \\ 0 & 0 & -a_3 & d_1C_{13} & d_2C_{13} & d_3C_{33} \end{bmatrix} \begin{bmatrix} A \\ B \\ C \\ D \\ E \\ F \end{bmatrix} = \begin{bmatrix} 0 \\ 0 \\ 0 \end{bmatrix}$$

where:

the a values are the force data with respect to an axis of material symmetry of the material;

the d values are the displacement data with respect to the axis of material symmetry of the material;

where the Cijs are populated with the known mechanical rock property of the material; and A-F are the set of scalars.

16. The method of claim 13 wherein the known mechanical rock property is obtained from at least one of sonic measurements, core measurements, cutting measurements, seismic measurements, wireline log measurements, and a mineralogical model.

17. The method of claim 13 wherein the material is cement.

18. The method of claim 13 wherein the signals are acoustical signals, the one or more sensors are at least one of an accelerometers and a strain gauge, the component of the drill bit is a bottom hole assembly, the material is cement and the known mechanical rock property includes values for $C_{11}$ and $C_{12}$.

19. A method of obtaining stress and strain comprising:

obtaining, with a processor, acoustical signals indicative of a force and a displacement, the signals obtained from one or more sensors positioned on a component of a bottom hole assembly, the force and displacement of a drill bit interacting with a material with known mechanical rock properties;

processing, with the processor, the forces and the displacements to obtain a set of scalars that conform to a stress strain relationship of the material with known mechanical rock properties; and applying, with the processor, the set of scalars to the forces and the displacements to obtain stress and strain generated by the drill bit interacting with the material.

20. The method of claim 19 wherein the stress strain relationship is:

$$\begin{bmatrix} Dd_1 & (Ed_2 + Fd_3) \\ Ed_2 & (Dd_1 + Fd_3) \\ Fd_3 & (Dd_1 + Ed_2) \end{bmatrix} \begin{bmatrix} C_{11} \\ C_{12} \end{bmatrix} = \begin{bmatrix} Aa_1 \\ Ba_2 \\ Ca_3 \end{bmatrix}$$

where:

the a values are forces or accelerations acting on the drill bit interacting with the sample;

the d values are displacements the drill bit interacting with the sample;

where $C_{11}$ and $C_{12}$ are populated with known rock properties of the sample; and A-F are the set of scalars being obtained.

21. The method of claim 20 wherein:

the a values are an axial (a1) acceleration, a lateral (a2) acceleration and a centripetal (a3) acceleration of the drill bit;

the d values are an axial (d1) displacement, a lateral (d2) displacement and a centripetal (d3) displacement;

the obtained stresses are an axial stress, a lateral stress and a centripetal stress from the respective scalars A, B, and C multiplied by the respective a-values a1, a2 and a3; and the obtained strains are an axial strain, a lateral strain and a centripetal strain from the respective scalars D, E, and F multiplied by the respective d-values d1, d2, and d3.

22. The method of claim 19 further comprising:
obtaining the scalars by:
using a computer model of the stresses and strains of a sample material with known mechanical rock properties to obtain the stresses generated on the sample by a drill bit interacting with the sample and using the computer model to obtain the strains experienced by the sample of the drill bit interacting with the sample, further to obtain the scalars that conform to the stress strain relationship of the sample with the known mechanical rock properties.

23. The method of claim 22 wherein the stress strain relationship is:

$$A = \frac{a_1}{\sigma}, B = \frac{a_2}{\tau}, C = \frac{a_3}{\tau}, D = \frac{d_1}{\varepsilon}, E = \frac{d_2}{\varepsilon}, F = \frac{d_3}{\varepsilon}$$

where:
the a values are acceleration data of the drill bit interacting with the formation with respect to an axis of drilling;
the d values are displacement data of the drill bit interacting with the formation and with respect to the axis of drilling;
where $\sigma$ and $\tau$ are the axial stress and one of lateral or angular stress are populated with the computer model;
$\varepsilon$ are the axial strain and one of lateral or angular stress are populated with the computer model; and
A-F are the scalars.

24. An apparatus comprising:
a hardware processor in communication with a non-transitory computer readable media including computer executable instructions to perform a method of:
accessing a first set of acoustical signals obtained from one or more sensors, the acoustical signals generated from a drill bit interacting with a rock formation while drilling a wellbore;
processing the first set of acoustical signals to obtain forces acting on the drill bit interacting with the rock formation while drilling the wellbore and to obtain displacements of the drill bit interacting with the rock formation while drilling the wellbore;
scaling the obtained forces acting on the drill bit interacting with the rock formation while drilling the wellbore and the obtained displacements of the drill bit interacting with the rock formation while drilling the wellbore to obtain information representative of stresses and strains of the rock formation; and
processing the scaled forces and the scaled displacements to obtain and store in a tangible memory at least one set of data values representative of a mechanical rock property of the rock formation along the wellbore created by the drill bit interacting with the rock formation for a period of time.

25. The apparatus of claim 24 wherein the computer executable instructions are further to perform the method of:
applying scalars to the obtained forces acting on the drill bit interacting with the rock formation while drilling the wellbore and the obtained displacements of the drill bit interacting with the rock formation while drilling the wellbore, the scalars derived from acoustical signals generated from the drill bit acting on a sample with known mechanical rock properties; and
obtaining the scalars by:
receiving a second set of acoustical signals obtained from the one or more sensors wherein the one or more sensors are positioned on a component of a bottom hole assembly, the second set of acoustical signals generated from the drill bit interacting with the sample;
processing the second set of acoustical signals to obtain forces acting on the drill bit interacting with the sample and to obtain displacements of the drill bit interacting with the sample;
processing the obtained forces acting on the drill bit interacting with the sample and the obtained displacements of the drill bit interacting with the sample to obtain the scalars that conform to a stress strain relationship of the sample with known mechanical rock properties.

26. The apparatus of claim 25 wherein the stress strain relationship is:

$$\begin{bmatrix} -a_1 & 0 & 0 & d_1C_{11} & d_2C_{12} & d_3C_{12} \\ 0 & -a_2 & 0 & d_1C_{12} & d_2C_{11} & d_3C_{12} \\ 0 & 0 & -a_3 & d_1C_{12} & d_2C_{12} & d_3C_{11} \end{bmatrix} \begin{bmatrix} A \\ B \\ C \\ D \\ E \\ F \end{bmatrix} = \begin{bmatrix} 0 \\ 0 \\ 0 \end{bmatrix}$$

where:
the a values are forces or accelerations acting on the drill bit interacting with the sample;
the d values are displacements the drill bit interacting with the sample;
where $C_{11}$ and $C_{12}$ are populated with known rock properties of the sample; and
A-F are the scalars being obtained.

27. An apparatus comprising:
a hardware processor in communication with a non-transitory computer readable media including computer executable instructions to perform a method of:
obtaining a force data and a displacement data from signals obtained from one or more sensors positioned on a component of a drilling tool proximate a drill bit, the force data and the displacement data being of a drill bit interacting with a material with known mechanical rock properties;
processing the force data and the displacement data to obtain and store in a tangible memory a set of scalars that conform to a stress strain relationship of the material with a known mechanical rock property.

28. The apparatus of claim 27 wherein the stress strain relationship is:

$$\begin{bmatrix} -a_1 & 0 & 0 & d_1C_{11} & d_2C_{12} & d_3C_{12} \\ 0 & -a_2 & 0 & d_1C_{12} & d_2C_{11} & d_3C_{12} \\ 0 & 0 & -a_3 & d_1C_{12} & d_2C_{12} & d_3C_{11} \end{bmatrix} \begin{bmatrix} A \\ B \\ C \\ D \\ E \\ F \end{bmatrix} = \begin{bmatrix} 0 \\ 0 \\ 0 \end{bmatrix}$$

where:
- the a values are the force data with respect to an axis of material symmetry of the material;
- the d values are the displacement data with respect to the axis of material symmetry of the material;
- where $C_{11}$ and $C_{12}$ are populated with the known rock property of the material; and
- A-F are the set of scalars.

29. The apparatus of claim 27 wherein the stress strain relationship is:

$$\begin{bmatrix} -a_1 & 0 & 0 & d_1 C_{11} & d_2 C_{12} & d_3 C_{13} \\ 0 & -a_2 & 0 & d_1 C_{12} & d_2 C_{11} & d_3 C_{13} \\ 0 & 0 & -a_3 & d_1 C_{13} & d_2 C_{13} & d_3 C_{33} \end{bmatrix} \begin{bmatrix} A \\ B \\ C \\ D \\ E \\ F \end{bmatrix} = \begin{bmatrix} 0 \\ 0 \\ 0 \end{bmatrix}$$

where:
- the a values are the force data with respect to an axis of material symmetry of the material;
- the d values are the displacement data with respect to the axis of material symmetry of the material;
- where the Cijs are populated with the known mechanical rock property of the material; and
- A-F are the set of scalars.

* * * * *